US006490519B1

(12) United States Patent
Lapidot et al.

(10) Patent No.: US 6,490,519 B1
(45) Date of Patent: **\*Dec. 3, 2002**

(54) TRAFFIC MONITORING SYSTEM AND METHODS FOR TRAFFIC MONITORING AND ROUTE GUIDANCE USEFUL THEREWITH

(75) Inventors: Dror Lapidot, Tel-Aviv (IL); Jonathan Silverberg, Tel-Aviv (IL)

(73) Assignee: Decell, inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/668,484

(22) Filed: Sep. 25, 2000

Related U.S. Application Data

(63) Continuation-in-part of application No. 09/406,537, filed on Sep. 27, 1999, now Pat. No. 6,341,255.

(51) Int. Cl.[7] .............................. G06F 7/00; G08G 1/09
(52) U.S. Cl. ........................ 701/117; 701/119; 340/905
(58) Field of Search .................................. 701/117, 118, 701/119, 207, 209, 210; 340/905, 933–935

(56) References Cited

U.S. PATENT DOCUMENTS 6,341,255 B1 * 1/2002 Lapidot ....................... 701/209

\* cited by examiner

Primary Examiner—William A. Cuchlinski, Jr.
Assistant Examiner—Edward Pipala
(74) Attorney, Agent, or Firm—Abelman, Frayne & Schwab

(57) ABSTRACT

A traffic monitoring system for monitoring traffic including a population of users bearing a multiplicity of mobile communication devices, and methods useful for monitoring traffic, the system including a mobile communication network interface receiving, from at least one communication network serving the multiplicity of mobile communication devices, and storing, location information characterizing at least some of the multiplicity of mobile communication devices, and a traffic monitor operative to compute at least one traffic-characterizing parameter on the basis of the location information.

50 Claims, 24 Drawing Sheets

FIG. 11A

| ID | NAME | IMPORTANCE | LENGTH | NEED FOR UPDATE | TRAVEL TIME (SECS) | SPEED (KPH) | DENSITY (CARS/KM) | FLOW (CARS/MIN) |
|---|---|---|---|---|---|---|---|---|
| 1 | ROUTE 101 | 0.3 | 13KM | 0.1 | 1040 | 45 | 122 | 92 |
| 2 | NJ TURNPIKE: EXIT 18 TO 18A | 1 | 12KM | 0.2 | 480 | 90 | 56 | 84 |
| 3 | NJ TURNPIKE: EXIT 18A TO 18 | 1 | 12.1KM | 0.2 | 580 | 75 | 89 | 111 |
| 4 | THE BELT PARKWAY | 0.7 | 6KM | 0.5 | 216 | 100 | 34 | 57 |

FIG. 11B

| Segment ID | Cell ID | Reference point | Cell size | Cell-segment probability | Association |
|---|---|---|---|---|---|
| 1 | 45A | 0.3km | 650m | 25% | Begin |
| 1 | 56B | 0.8km | 300m | 30% | Begin |
| 1 | 84C | 1.1km | 560m | 35% | Middle |
| 1 | 45C | 11.4km | 1270m | 29% | End |
| 2 | 56B | 0.4km | 290m | 3% | Begin |
| 2 | 29A | 0.9km | 450m | 12% | Middle |

FIG. 11C

| User ID | Cell ID | Source | Time stamp |
|---|---|---|---|
| 2345 | 84B | CDR | 11:03:23 |
| 1234 | 84B | Location server Query reply | 11:04:35 |
| 2345 | 26C | Handset location output | 11:08:17 |

FIG. 11D

| 1st Cell | 2nd Cell | 3rd Cell | Last Cell | Segment ID |
|---|---|---|---|---|
| 45A | - | - | 38C | 1 |
| 56B | 34B | - | 69C | 1 |
| 56B | - | - | 69A | 2 |
| 56C | - | - | 78B | 2 |

FIG. 11E

| User ID | Segment ID | Time stamp |
|---|---|---|
| 1234 | 1 | 1/1/00   12:34:56 |
| 1234 | 2 | 10:30   27/10/72 |
| 2345 | 1 | 12:00   29/9/72 |

FIG. 11F

| Segment ID | Time | Typical travel speed | Typical vehvile density |
|---|---|---|---|
| 1 | Weekdays: 7:00-7:30 | 45 kph | 220 cars/km |
| 1 | Everyday: 3:00-4:30 | Unlimited | 16 cars/km |
| 2 | Weekends: 11:00-12:00 | 65 kph | 20 cars/km |

FIG. 11G

| Segment ID | User ID | Status | Begin Time | Begin Cell | Update time | End Cell | Estimated Travel Probability |
|---|---|---|---|---|---|---|---|
| 1 | 1234 | Pending | 11:33:20 | 45A | 11:34:23 (scheduled) | - | 35% |
| 2 | 2345 | Updated | 11:06:00 | 56B | 11:12:00 | 69A | - |
| 3 | 2345 | Pending | 11:53:45 | 56B | 11:56:29 (scheduled) | - | 49% |

FIG. 11H

| Time stamp | Begin Cell-ID | Segment Traveled |
|---|---|---|
| 12:10:34 | 45H | 12 |
| 12:45:16 | 45H | Non-relevant(=discarded) |
| 13:00:08 | 56T | 19 |

FIG. 11I

| Route ID | Segment ID | Segment numbering in route |
|---|---|---|
| 1 | 12 | 1 |
| 2 | 13 | 1 |
| 3 | 12 | 1 |
| 3 | 13 | 2 |

FIG. 11J

| User ID | Segment ID | Habitual travel periods |
|---|---|---|
| 1234 | 1 | Weekdays: 6:30-8:15 |
| 1234 | 2 | Weekends: all day |
| 2345 | 1 | Mondays: 17:30-19:00 |

FIG. 11K

| SEGMENT ID | TIME | TRAVEL TIME (SECS) | SPEED (KPH) | DENSITY (CARS/ KM) | FLOW (CARS /MIN) |
|---|---|---|---|---|---|
| 1 | 1/1/00 12:34:56 | 0.1 | 1040 | 45 | 122 |
| 1 | 27/10/72 10:30 | 0.2 | 480 | 90 | 56 |
| 2 | 29/9/72 12:00 | 0.2 | 580 | 75 | 89 |

FIG. 18A

| Vertex ID | North Coordinate | East Coordinate |
|---|---|---|
| 1 | 634567 | 367467 |
| 2 | 623456 | 340836 |
| 3 | 604750 | 387245 |

FIG. 18B

| Segment ID | Origin Vertex ID | Destination Vertex ID |
|---|---|---|
| 1 | 1 | 2 |
| 2 | 1 | 3 |
| 3 | 2 | 3 |
| 4 | 3 | 1 |

FIG. 18C

| Route ID | Segment index | Segment ID |
|---|---|---|
| 1 | 1 | 1 |
| 2 | 1 | 2 |
| 3 | 1 | 1 |
| 3 | 2 | 2 |

TRAFFIC MONITORING SYSTEM AND METHODS FOR TRAFFIC MONITORING AND ROUTE GUIDANCE USEFUL THEREWITH

This application is a continuation-in-part of Ser. No. 09/406,537 filed Sep. 27, 1999 now U.S. Pat. No. 6,341,255.

FIELD OF THE INVENTION

The present invention relates to apparatus and methods for providing route guidance to vehicles.

BACKGROUND OF THE INVENTION

Navigation systems which compute a route for a vehicle designed to bring the vehicle from its current location to a desired location are known.

A document entitled "DynaMIT:Task C Report", posted at MIT website its.mit.edu/projects/dta/Taskc, describes a traffic assignment system and notes, inter alia, that "In an (ideal) system . . . where there is two-way communication between the traffic control center and every vehicle in the network, perfect information about the vehicle location and possibly its origin and destination, can be obtained. While such perfect systems are possible in the future, most existing surveillance systems are limited to vehicle detectors located at critical points in the network. The information provided by these traffic sensors therefore must be used to infer traffic flows, queue lengths, incidents, etc., at all locations of the network."

Another document discussing pertinent technology and entitled "DynaMIT:DYnamic network assignment for the management of information to travellers" is posted at its.mit.edu/projects/dta/dynamit.

Traffic flow theory is a field in which experts endeavor to generate theoretical models of traffic flow in order to make predictions which are helpful in developing services and resources which will best serve traffic requirements. State of the art traffic flow theory is described in "Transportation Research Board's Revised Special Report", "Traffic Flow Theory", available at tfhrc.gov/its/tft/tft/. Development and verification of traffic flow models conventionally do not collect or utilize transmission from mobile communication devices residing in the vehicles within the traffic under investigation.

The Nokia 5100 and 6100 mobile phone series display their own current status, including an "in vehicle" status.

The disclosures of all publications mentioned in the specification and of the publications cited therein are hereby incorporated by reference.

SUMMARY OF THE INVENTION

The present invention seeks to provide an improved route guidance system.

There is thus provided, in accordance with a preferred embodiment of the present invention, a traffic monitoring system including traffic data collection apparatus operative to collect location data from a plurality of users of mobile communication devices, and a traffic data filter operative to analyze the location data arriving from the plurality of users and to reject location data which is not traffic data.

Preferably, the traffic data filter includes a traffic element identifier operative to identify traffic elements within the plurality of users by analyzing the location data arriving from the plurality of users.

Further in accordance with a preferred embodiment of the present invention, the location data includes a sequence of at least one time-stamped locations.

Still further in accordance with a preferred embodiment of the present invention, the traffic data filter is operative to accept, as traffic data, the location data arriving from users who have identified themselves as traffic elements.

Also provided, in accordance with another preferred embodiment of the present invention, is a traffic monitoring system including location collection apparatus operative to collect location data from at least a traffic population including a multiplicity of traffic elements, the multiplicity of traffic elements including a plurality of users of mobile communication devices, a location data analyzer operative to analyze the location data and to derive traffic information therefrom, and a traffic information disseminator operative to provide at least some of the traffic population with the traffic information.

Further in accordance with a preferred embodiment of the present invention, the location data analyzer is operative to derive, for at least one traffic element, at least a portion of a road route followed by the traffic element.

Still further in accordance with a preferred embodiment of the present invention, the location data defining the location of a mobile communication device at time t is based on an identification of a mobile communication cell serving the mobile communication device at time t.

Additionally in accordance with a preferred embodiment of the present invention, the location data defining the location of a mobile communication device at time t is based only on an identification of a mobile communication cell serving the mobile communication device at time t.

Also provided, in accordance with still another preferred embodiment of the present invention, is a traffic monitoring method including collecting location data from a plurality of users of mobile communication devices, and analyzing the location data arriving from the plurality of users and rejecting location data which is not traffic data.

Further in accordance with a preferred embodiment of the present invention, the method also includes rejecting location data indicating a too-large discrepancy between a current location of a vehicle and its stored previous locations.

Further in accordance with a preferred embodiment of the present invention, the system also includes a user location database storing, for each mobile communication device from which readings have been received, the ID of that device and each of the readings received, each with its own time-stamp.

Still further in accordance with a preferred embodiment of the present invention, the system also includes a road traffic database storing, for at least one road, velocity profiles computed for that road, each profile being stored with its own time-stamp.

Also provided, in accordance with still another preferred embodiment of the present invention, is a traffic monitoring system for monitoring traffic including a population of users bearing a multiplicity of mobile communication devices, the system including a mobile communication network interface receiving, from at least one communication network serving the multiplicity of mobile communication devices, and storing, location information characterizing at least some of the multiplicity of mobile communication devices, and a traffic monitor operative to compute at least one traffic-characterizing parameter on the basis of the location information.

Further in accordance with a preferred embodiment of the present invention, the traffic monitor is also operative to display the at least one traffic-characterizing parameter.

Still further in accordance with a preferred embodiment of the present invention, the mobile communication devices include cellular communication devices served by at least one cellular communication network including a plurality of base stations each serving a cell including a portion of a geographical area.

Additionally in accordance with a preferred embodiment of the present invention, the location information includes indications of cells serving at least some of the multiplicity of mobile communication devices.

Further in accordance with a preferred embodiment of the present invention, the system also includes a road database storing locations of roads in a geographical area.

Still further in accordance with a preferred embodiment of the present invention, the system also includes a road database storing locations of roads in a geographical area, wherein the traffic monitor is operative to deduce, based on at least one indication of a cell in which a mobile communication device is located, a road which the mobile communication device is believed to be taking.

Further in accordance with a preferred embodiment of the present invention, the traffic monitor is operative, based on an indication that an individual mobile communication device is travelling through a cell sequence including at least one cell, to differentiate a first road portion along which the individual mobile communication device is travelling, from a second road portion falling along the same cell sequence, along which the mobile communication device is not travelling.

Still further in accordance with a preferred embodiment of the present invention, the traffic monitor is operative to differentiate the first and second road portions by estimating at least one traffic parameter for the first and second road portions which parameter has different values for the first and second road portions.

Further in accordance with a preferred embodiment of the present invention, at least some traffic characterizing information is generated using communication cell ID-based location information which is at communication cell ID accuracy.

Still further in accordance with a preferred embodiment of the present invention, the traffic monitor is operative to identify a set of mobile communication devices suspected of be served by a cell other than the cell in which they are actually located and to verify at least some location information arriving from at least some of the mobile communication devices in the set.

Also in accordance with a preferred embodiment of the present invention, the at least one traffic-characterizing parameter includes at least one of the following group of parameters: a travel time parameter, a traffic speed parameter, a traffic density parameter, and a traffic flow parameter.

Further in accordance with a preferred embodiment of the present invention, the system also includes at least one historical database storing historical location information characterizing past distributions of users over a geographical area of interest, and the traffic monitor is, at least on occasion, operative to compute the at least one traffic-characterizing parameter at least partly on the basis of the historical location information.

Still further in accordance with a preferred embodiment of the present invention, the traffic monitor is operative to evaluate the quality of location information on the basis of which the traffic-characterizing parameter is to be computed and to employ the historical location information if the quality is found to be relatively low.

Additionally in accordance with a preferred embodiment of the present invention, the quality of location information is evaluated at least partly as a function of the number of users providing current location information.

Further in accordance with a preferred embodiment of the present invention, the mobile communication network interface receives and stores location information from cellular communication devices served by more than one cellular communication network.

Still further in accordance with a preferred embodiment of the present invention, the system also includes a mobile user pinpointing function operative to deduce, from information at communication cell ID accuracy, location information which is at an accuracy higher than communication cell ID accuracy, by combining the communication cell ID accuracy information with additional stored information.

Further in accordance with a preferred embodiment of the present invention, the additional stored information includes information regarding intersections between cells and roads.

Still further in accordance with a preferred embodiment of the present invention, the additional stored information includes information regarding a sequence of cells through which a user has passed.

Additionally in accordance with a preferred embodiment of the present invention, the mobile communication network interface receives at least some of the location information used by the traffic monitor, from a base station.

Further in accordance with a preferred embodiment of the present invention, the mobile communication network interface receives at least some of the location information used by the traffic monitor, from a CDR database.

Still further in accordance with a preferred embodiment of the present invention, the mobile communication network interface receives at least some of the location information used by the traffic monitor, from a location server.

Further in accordance with a preferred embodiment of the present invention, the mobile communication network interface receives at least some of the location information used by the traffic monitor, directly from at least some of the multiplicity of mobile communication devices.

Still further in accordance with a preferred embodiment of the present invention, at least some of the location information is provided responsive to a cell broadcast.

Additionally in accordance with a preferred embodiment of the present invention, at least some of the location information is provided responsive to a data transmission directed to individual ones of the multiplicity of mobile communication devices.

Further in accordance with a preferred embodiment of the present invention, the data transmission includes an SMS message.

Still further in accordance with a preferred embodiment of the present invention, at least some of the location information provided by the mobile communication devices is provided in SMS format.

Additionally in accordance with a preferred embodiment of the present invention, the mobile communication network interface also receives and stores travel time information and the traffic monitor is operative to compute at least one traffic-characterizing parameters on the basis of at least the travel time information.

Further in accordance with a preferred embodiment of the present invention, the location information does not violate the privacy of the users of the mobile communication devices.

Still further in accordance with a preferred embodiment of the present invention, the system also includes a congestion detector operative to detect at least one of generation and dissipation of mobile communication device congestion.

Additionally in accordance with a preferred embodiment of the present invention, the system also includes a congestion-anticipation based cellular network resource allocator operative to receive a congestion-indicative output from the congestion detector and to allocate resources accordingly.

Also provided, in accordance with another preferred embodiment of the present invention, is a route guidance method including monitoring traffic information characterizing traffic flowing along at least one routes, and computing and reporting to a traveller, information characterizing the traveller's expected travel time along each of the at least one routes.

Further in accordance with a preferred embodiment of the present invention, the method also includes providing an origin location and a destination location and computing at least one routes connecting the origin and destination locations.

Further in accordance with a preferred embodiment of the present invention, the computing step includes recomputing, at least once, information characterizing the traveller's remaining travel time along the route, as the traveller travels along the route.

Still further in accordance with a preferred embodiment of the present invention, the computing and reporting step includes reporting the information to the traveller only if the information deviates, in accordance with a predetermined deviation criterion, from a known travel time value.

Also provided, in accordance with another preferred embodiment of the present invention, is a route guidance method including monitoring the speed of traffic flowing through a geographical area, and generating a warning if there is a substantial change in the speed of traffic flowing through a portion of the geographical area.

Further in accordance with a preferred embodiment of the present invention, the method also includes storing information regarding personal driving habits of the traveller and wherein the computing and reporting step includes computing the information characterizing the traveller's expected travel time at least partly based on the information regarding the traveller's personal driving habits.

Further in accordance with a preferred embodiment of the present invention, the information regarding personal driving habits includes information characterizing travel time along a road sequence not monitored in the monitoring step.

Still further in accordance with a preferred embodiment of the present invention, the computing and reporting step includes reporting to the driver in IVR (interactive voice response) format.

Still further in accordance with a preferred embodiment of the present invention, the computing and reporting step includes reporting to the driver in a data transmission format.

Further in accordance with a preferred embodiment of the present invention, the data transmission format includes SMS (short message service).

Still further in accordance with a preferred embodiment of the present invention, the data transmission format includes WAP (wireless application protocol) format.

Further in accordance with a preferred embodiment of the present invention, the origin and destination locations are received from the driver.

Still further in accordance with a preferred embodiment of the present invention, the providing step includes setting the origin of the route to the current location of the driver.

Further in accordance with a preferred embodiment of the present invention, monitoring the current location of the driver is based on determining a cellular location of a mobile communication device riding with the driver.

Also provided, in accordance with another preferred embodiment of the present invention, is a route guidance method including monitoring traffic information characterizing traffic flowing along a route taken by a driver, including monitoring the current location of the driver, and computing information characterizing the driver's expected progress along the route and reporting the information to the driver when the driver arrives at a predetermined location along the route.

Also provided, in accordance with still another preferred embodiment of the present invention, is a directed advertisement method including receiving an indication from a travelling user of his desired destination, and providing advertisement content to the travelling user based on the desired destination.

Further in accordance with a preferred embodiment of the present invention, the advertisement providing step includes computing a recommended route to the desired destination and reporting the recommended route to the travelling user, and providing advertisement content to the travelling user which pertains to the recommended route.

Also provided, in accordance with another preferred embodiment of the present invention, is a route guidance system including a traffic velocity computer operative to receive the following information: a plurality of locations, separated by a known time interval, of at least one vehicle within traffic separating a moving vehicle's current location from the selected destination, and a route assigned to at least one vehicle within the traffic, and to compute at least one velocity characteristic of the traffic, and a route selecting computer operative to receive a selected destination of the moving vehicle and a current location of the moving vehicle, and to compute a route from the moving vehicle's current location to the moving vehicle's selected destination, at least partly as a function of the at least one velocity characteristic.

Also provided, in accordance with yet another preferred embodiment of the present invention, is a traffic velocity monitoring system including a representation of an area in which traffic travels, a vehicle location monitor operative to receive vehicle location information, from a multiplicity of moving vehicles, as to their current location, and a per-vehicle velocity computer operative to derive, from the vehicle location information and the representation, an average velocity of at least one individual moving vehicle from among the multiplicity of moving vehicles.

Further in accordance with a preferred embodiment of the present invention, the system also includes a global velocity computer operative to receive average velocities of each of a plurality of vehicles from the per-vehicle velocity computer and to compute therefrom an average velocity of traffic including the plurality of vehicles.

Also provided, in accordance with a preferred embodiment of the present invention, is a route guidance system including a traffic information accumulator operative to accumulate up-to-date traffic characterizing information characterizing traffic including a route assigned to at least one vehicle within the traffic, and a route selecting computer operative to compute a route from a moving vehicle's current location to the moving vehicle's selected destination, at least partly as a function of the traffic characterizing information.

Further in accordance with a preferred embodiment of the present invention, the route computed by the route selecting computer is fed back to the traffic information accumulator and is employed by the accumulator to generate anticipated traffic information estimating characteristics of traffic separating a future location of the moving vehicle from the moving vehicle's selected destination.

Still further in accordance with a preferred embodiment of the present invention, the route selecting computer includes a dynamic route selecting computer operative to provide the moving vehicle with ongoing modifications of the route at least partly as a function of the anticipated traffic information.

Further in accordance with a preferred embodiment of the present invention, the route selecting computer randomly selects at least a portion of at least one vehicle's route from among several candidate route portions for that vehicle, the random selection being biased by the relative merits of the candidate route portions for the vehicle.

Still further in accordance with a preferred embodiment of the present invention, the traffic information accumulator is also operative to receive up-to-date information characterizing road conditions in road segments separating the vehicle's current location from the vehicle's selected destination.

Further in accordance with a preferred embodiment of the present invention, the road conditions include permanent road conditions and/or transient road conditions.

Still further in accordance with a preferred embodiment of the present invention, the transient road conditions include states of multi-state traffic governing elements.

Further in accordance with a preferred embodiment of the present invention, the multi-state traffic governing elements include at least one of the following: a traffic light having more than one possible schedule, and a digital sign displaying any of a plurality of route-guiding messages.

Still further in accordance with a preferred embodiment of the present invention, the traffic information accumulator is operative to provide information to the multi-state traffic governing elements and the multi-state traffic governing elements are operative to select a state at least partly in response to the information.

Further in accordance with a preferred embodiment of the present invention, the accumulator includes a traffic flow simulator operative to generate at least some of the anticipated traffic information.

Still further in accordance with a preferred embodiment of the present invention, the traffic characterizing information includes quantitative information.

Further in accordance with a preferred embodiment of the present invention, the route selecting computer includes a multiplicity of independent route selecting units located within each of a multiplicity of vehicles respectively.

Still further in accordance with a preferred embodiment of the present invention, the route selecting computer includes a central unit operative to compute a route for each of a multiplicity of vehicles and to transmit each vehicle's route to that vehicle.

Also provided, in accordance with another preferred embodiment of the present invention, is a route guidance system including a traffic velocity computer operative to accept a plurality of locations, separated by a known time interval, of at least one vehicle within traffic separating the moving vehicle's current location from the selected destination, and to compute at least one velocity characteristic of the traffic, and a route selecting computer operative to receive a selected destination of a moving vehicle and a current location of the moving vehicle, and to compute a route from the moving vehicle's current location to the moving vehicle's selected destination, at least partly as a function of the at least one velocity characteristic.

Further in accordance with a preferred embodiment of the present invention, the route selecting computer is operative to compute and display an estimated arrival time for the moving vehicle.

Further in accordance with a preferred embodiment of the present invention, the system also includes a route display unit operative to display to a driver of the moving vehicle, at least one directive derived from the route.

Also provided, in accordance with another preferred embodiment of the present invention, is a route guidance method including receiving the following information: a selected destination of a moving vehicle, a current location of the moving vehicle, and a plurality of locations, separated by a known time interval, of at least one vehicle within traffic separating the moving vehicle's current location from the selected destination, and a route assigned to at least one vehicle within the traffic, computing at least one velocity characteristic of the traffic, and computing a route from the moving vehicle's current location to the moving vehicle's selected destination, at least partly as a function of the at least one velocity characteristic.

Also provided, in accordance with another preferred embodiment of the present invention, is a traffic velocity monitoring method including providing a representation of an area in which traffic travels, receiving vehicle location information, from a multiplicity of moving vehicles, as to their current location, and deriving, from the vehicle location information and the representation, an average velocity of at least one individual moving vehicle from among the multiplicity of moving vehicles.

Also provided, in accordance with another preferred embodiment of the present invention, is a route guidance method including accumulating up-to-date information characterizing traffic including a route assigned to at least one vehicle within the traffic, and computing a route from a moving vehicle's current location to the moving vehicle's selected destination, at least partly as a function of the traffic characterizing information.

Further provided, in accordance with still another preferred embodiment of the present invention, is a route guidance method including providing the following information: a selected destination of a moving vehicle, a current location of the moving vehicle, and a plurality of locations, separated by a known time interval, of at least one vehicle within traffic separating the moving vehicle's current location from the selected destination, computing at least one velocity characteristic of the traffic, and computing a route from the moving vehicle's current location to the moving vehicle's selected destination, at least partly as a function of the at least one velocity characteristic.

Also provided, in accordance with still another preferred embodiment of the present invention, is a route guidance system including a traffic quantifier operative to receive the following information: traffic location information describing a location of at least one vehicle within traffic separating a moving vehicle's current location from the selected destination, and a route assigned to at least one vehicle within the traffic, and to compute at least one quantitative characteristic of the traffic, and a route selecting computer operative to receive a selected destination of the moving vehicle and a current location of the moving vehicle, and to compute a route from the moving vehicle's current location to the moving vehicle's selected destination, at least partly as a function of the at least one quantitative characteristic.

Further provided, in accordance with still another preferred embodiment of the present invention, is a route guidance method including receiving the following information: a selected destination of a moving vehicle, a current location of the moving vehicle, and a route assigned to at least one vehicle within the traffic, computing at least one quantitative characteristic of the traffic, and computing a route from the moving vehicle's current location to the moving vehicle's selected destination, at least partly as a function of the at least one quantitative characteristic.

Also provided, in accordance with another preferred embodiment of the present invention, is a route guidance system including a traffic quantification computer operative to provide a quantitative characterization of traffic separating the moving vehicle's current location from the selected destination, and a route selecting computer operative to receive a selected destination of a moving vehicle and a current location of the moving vehicle, and to compute a route from the moving vehicle's current location to the moving vehicle's selected destination, at least partly as a function of the quantitative characterization.

Further in accordance with a preferred embodiment of the present invention, the method also includes employing a global average velocity of a sample of moving vehicles to estimate average velocity of traffic.

Still further in accordance with a preferred embodiment of the present invention, the traffic characterizing information employed by the route selecting computer includes information regarding anticipated traffic.

Further in accordance with a preferred embodiment of the present invention, at least one of the plurality of locations is computed by a digital cellular operator.

Still further in accordance with a preferred embodiment of the present invention, at least one of the plurality of locations includes GPS information.

Further in accordance with a preferred embodiment of the present invention, the route selecting computer is operative to receive the moving vehicle's current location from a digital cellular operator.

Further in accordance with a preferred embodiment of the present invention, the route selecting computer takes into account at least one road characteristic affecting average traffic speed.

Still further in accordance with a preferred embodiment of the present invention, the road characteristic includes a time-dependent road characteristic and/or a permanent road characteristic.

Also provided, in accordance with another preferred embodiment of the present invention, is a method for monitoring a population of users bearing mobile communication devices, the method including receiving information from a user bearing a mobile communication device which is indicative of his destination, and accumulating the information and providing the information to at least one element serving the population of users.

Further in accordance with a preferred embodiment of the present invention, the user bearing a mobile communication device is a vehicle bearing a mobile communication device.

Further in accordance with a preferred embodiment of the present invention, the identification of a mobile communication cell includes at least one of the following identification information elements: an ID of the cell, a cell sector, and a time advance parameter characterizing communication between the mobile communication device and the cell's base station.

Further in accordance with a preferred embodiment of the present invention, the historical location information includes historical traffic information including at least one traffic parameter characterizing at least one road segment for at least one point of time in the past.

Still further in accordance with a preferred embodiment of the present invention, the information regarding a sequence includes a time-stamped identification of at least one pair of adjacent cells between which the user has passed.

Still further in accordance with a preferred embodiment of the present invention, the mobile communication network interface receives at least some of the location information used by the traffic monitor, from a cellular switch.

Further in accordance with a preferred embodiment of the present invention, the congestion detector employs the historical location information to anticipate future locations of mobile communication devices.

Still further in accordance with a preferred embodiment of the present invention, the at least one routes include a plurality of routes joining a single origin to a single destination.

Additionally in accordance with a preferred embodiment of the present invention, the deviation criterion includes deeming as a travel time deviation, an increase in travel time over a route which affects the relative attractiveness of the route relative to at least one alternative route.

Further in accordance with a preferred embodiment of the present invention, the traffic monitor is also operative to receive speed data derived from a change in at least one parameter, such as but not limited to communication frequency and/or rate of data transfer, characterizing communication between at least one mobile communication device and a base station serving it and to compute at least one traffic-characterizing parameter at least partly based on the speed data.

The term "traffic information" refers to any type of information describing an effect of the traffic on an individual, such as information defining a desired route for the individual, given the traffic on the various alternative routes, and/or the estimated time of arrival of a vehicle at its destination, given the traffic en route.

The term "road route" refers to the sequence of streets or roads followed by an individual vehicle.

The term "traffic element" may refer to the general population of transmitting vehicles, as opposed to pedestrians, but preferably refers to only those vehicles which advance within the general traffic pattern, as opposed, e.g. to emergency vehicles.

The term "mobile user" refers to a user of a mobile communication device.

BRIEF DESCRIPTION OF THE DRAWINGS

The present invention will be understood and appreciated from the following detailed description, taken in conjunction with the drawings in which:

FIGS. 11A–11K, taken together, form a simplified representation of a preferred data structure for the historical database, cell/road database and CDR window and reply database of FIG. 10;

FIGS. 18A–18C, taken together, form a preferred data structure for the roadmap database of FIG. 10.

DETAILED DESCRIPTION OF PREFERRED EMBODIMENTS

Figure 1:
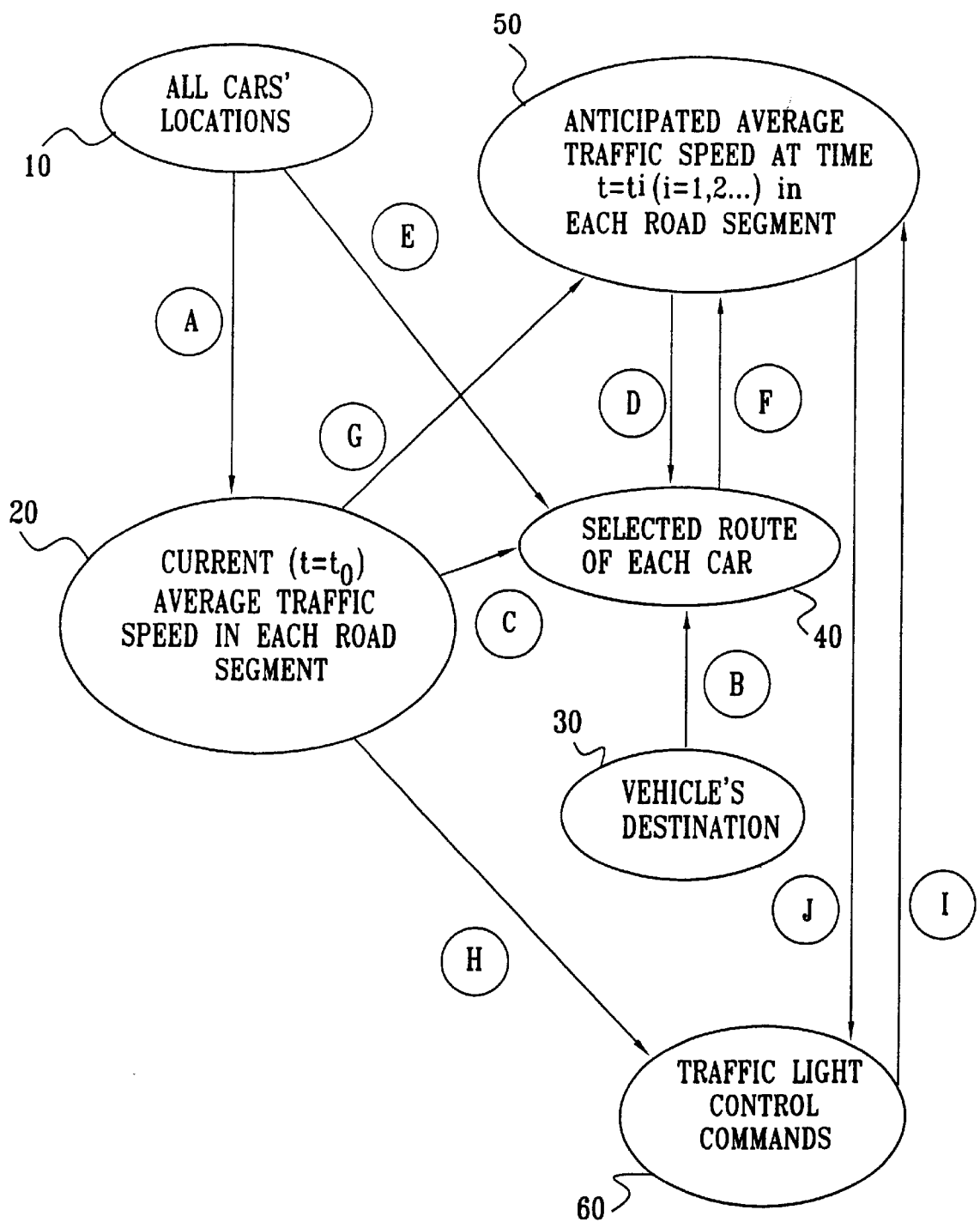
FIG. 1 is a data flow diagram of a driving route guidance system constructed and operative in accordance with a preferred embodiment of the present invention.

Reference is now made to FIG. 1 which is a data flow diagram of a driving route guidance system constructed and operative in accordance with a preferred embodiment of the present invention.

Data elements are represented as ellipses and arrows, marked by letters A–J, indicating the flow of data.

Arrow A indicates a typically periodic probe of vehicle locations, for all vehicles being served by the system or more typically, for only a sample of the vehicles being served by the system.

As each sample of vehicles is selected, the location of all vehicles in the sample is computed (e.g. by a digital cellular operator or by any other vehicle location source) at the beginning as well as at the end of some specified time period (e.g. one minute). In the case of digital cellular location vehicle location computation can be performed as a response to messages sent out by these vehicles' mobile phones at the beginning and at the end of this time period. Based on each car's locations at the beginning and at the end of the specified time period, provided to the system by a digital cellular operator or by any other vehicle location source, the system computes the average velocity of each car belonging to the sample during this time period. For each road segment and each time period the system derives, from the per-car velocity information, the approximate average velocity of all vehicles driving along the road segment during that time period.

Figure 5:
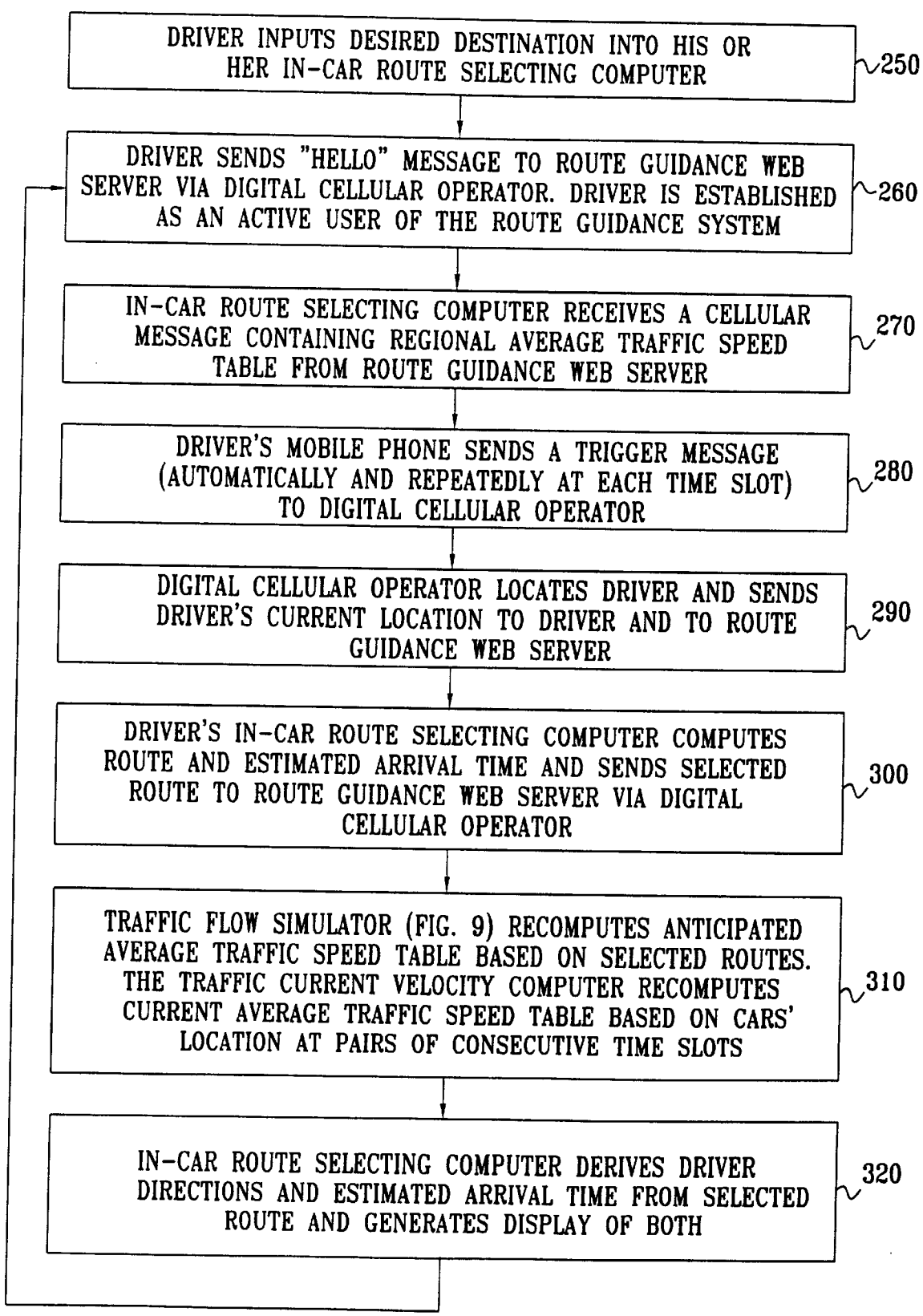
FIG. 5 is a simplified flowchart illustration of an individual driver's interaction with the route guidance system of FIG. 2.
Figure 6:
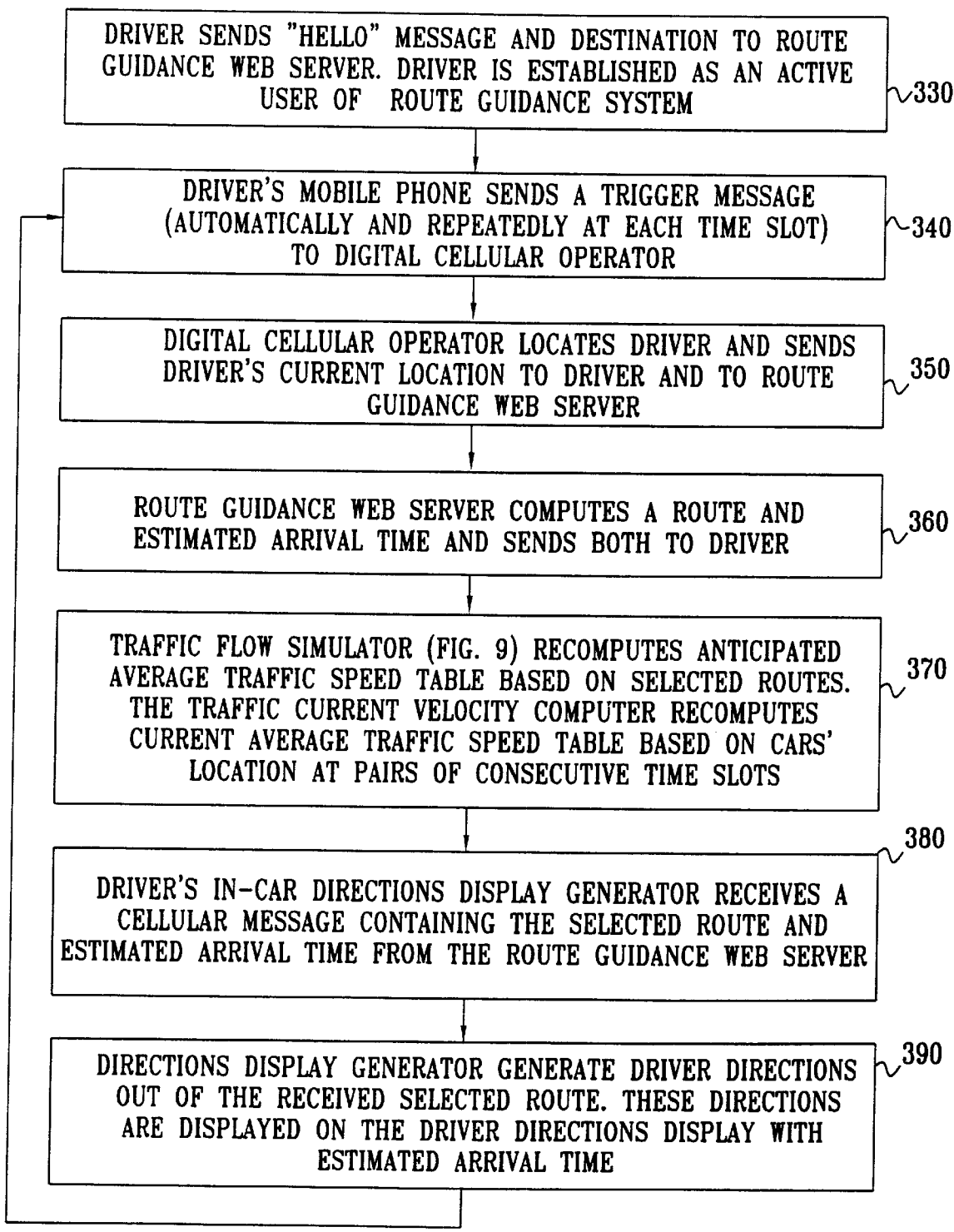
FIG. 6 is a simplified flowchart illustration of an individual driver's interaction with the route guidance system of FIG. 4.

As shown in FIGS. 5–6, periodic computations of anticipated average traffic velocity in each road segment are preferably performed by simulating traffic through the road network, based on selected routes, and periodically "freezing" the traffic picture, typically at two instances in time which are, say, one minute apart, and computing average velocities in each road segment by comparing the locations of the vehicles at the two instances in time.

The size of sample, i.e. proportion of vehicles which are sampled, should be as large as possible, typically restricted only by the digital cellular operator's limitations. For example, in order to carry out a cellular-based computation of a vehicle's location, a signal or a message output by the vehicle's mobile phone is typically provided and thus the limitations of simultaneous message capacity of the actual digital cellular operator are relevant. Similarly, other limitations may exist in embodiments which employ other systems as sources for vehicle location information.

The sampling frequency typically depends on the digital cellular operator's limitations and on the estimated error of vehicles' location. Estimated error depends on the reliability of the source of vehicle location information. This source may, for example, comprise a digital cellular operator, GPS (global positioning system) or any other suitable source. Sampling frequency is typically higher if the vehicle is travelling in the city, relative to a situation in which the vehicle is driving along a freeway.

Any suitable source for vehicle location information may be employed, such as GPS information. In the illustrated embodiment, vehicle location is derived by a digital mobile communication network operator, also termed herein "digital cellular operator", based on messages or signals which are sent by mobile communication devices, such as mobile telephones, mounted on the vehicles.

Typically, messages triggering vehicle location computation, which may even be empty messages, are automatically and repeatedly sent out from any mobile phone served by the system once every time slot. Mobile phones located within vehicles falling within the sample send such automatic cellular messages at least one more time during the time slot in which they were selected for the sample.

Optionally, different subsets of sampled vehicles are more or less frequently sampled. For example, vehicles travelling in town (rather than between towns or cities) may be more frequently sampled because many detour options are available in town such that the vehicle's actual trajectory can only be tracked by frequently sampling the vehicle's location.

Arrow B: Destination is typically input by the user, e.g. by voice or by means of a suitable key-in device on the user's in-car computer. In case the route is not in-car computed, the destination may be sent by the in-car computer to the entity in charge of route computation.

Arrows C and D: An individual driver's route may be selected to minimize the driver's driving time, based on current and anticipated average traffic speeds on candidate roads and road segments. Alternatively, all drivers' routes may be selected to minimize the total drivers' driving time, again based on current and anticipated average traffic speeds on candidate roads. and road segments.

Optionally, if two candidate routes are substantially equivalent as to travel time, then route selection involves an unbiased random choice between these two routes.

Optionally, if there is only a slight difference between anticipated travel times over two candidate routes, route selection involves a biased random choice between these two routes, where the weighting of the biased random choice depends on the relationship between the average traffic speeds on the two candidate routes, on the relative lengths of the two candidate routes and also optionally on the absolute lengths of the candidate routes and the rate of flow of traffic speed information to users of the system (which is affected inter alia by the sampling frequency or frequencies employed by the system) and/or the time which elapses until new traffic affects average traffic speed.

More generally, optionally, road characteristics such as width, number of lanes, length, topography, surface quality, traffic regulations and aesthetics are taken into account when determining anticipated average traffic speeds and/or selected routes. Typically, permanent and time-dependent road characteristics are taken into account. Time-dependent road characteristics include, for example, rainy or snowy conditions which affect effective quality of the road and hence average traffic speed. Another example of a time-dependent road characteristic is an accident, construction project or other road obstructing occurrence which is going to affect the traffic for some time. One way to handle time-dependent road characteristics is to define an "anticipated number of lanes" variable which defines as lanes only those lanes which are not blocked by road-obstructing occurrences.

Arrow E: To select a route, the current location of a car is an important input.

Arrow F: Selected routes are preferably sent to the system in order to update anticipated average traffic velocity along each road segment.

Arrow G: The current average traffic velocity in a specific road segment affects the anticipated average traffic velocity in other roads (or road segments) that the specific road segment leads into, directly or ultimately.

Figure 7:
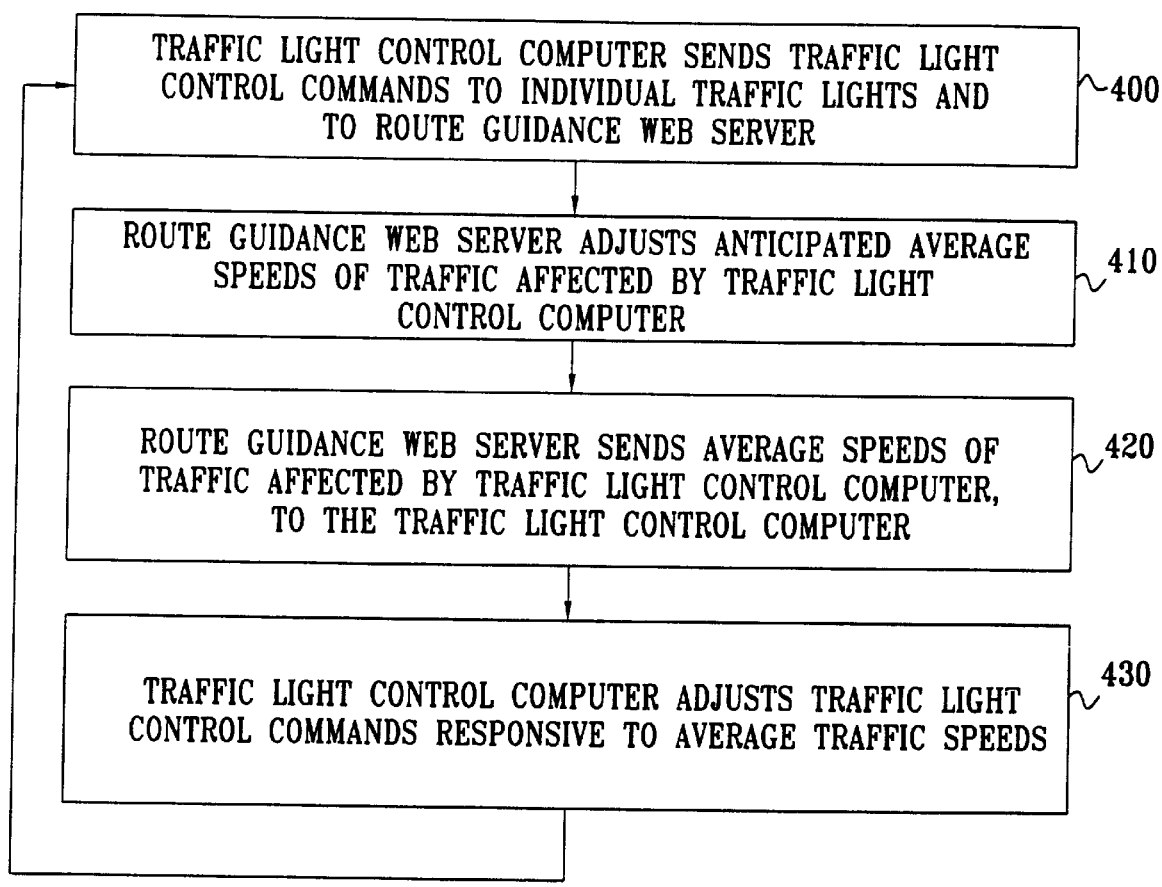
FIG. 7 is a simplified flowchart illustration of an individual traffic light control computer's interaction with the route guidance system of the present invention.

Arrows H, I and J: Typically, the route guidance system of the present invention exchanges data with existing traffic light control systems as shown in FIG. 7. Similarly, the route guidance system of the present invention may exchange data with other computer-controlled systems affecting traffic flow such as ramp traffic control or digital roadside route guidance signs or traffic information signs directing traffic to or away from a certain route, or providing information regarding one or more routes.

Figure 2:
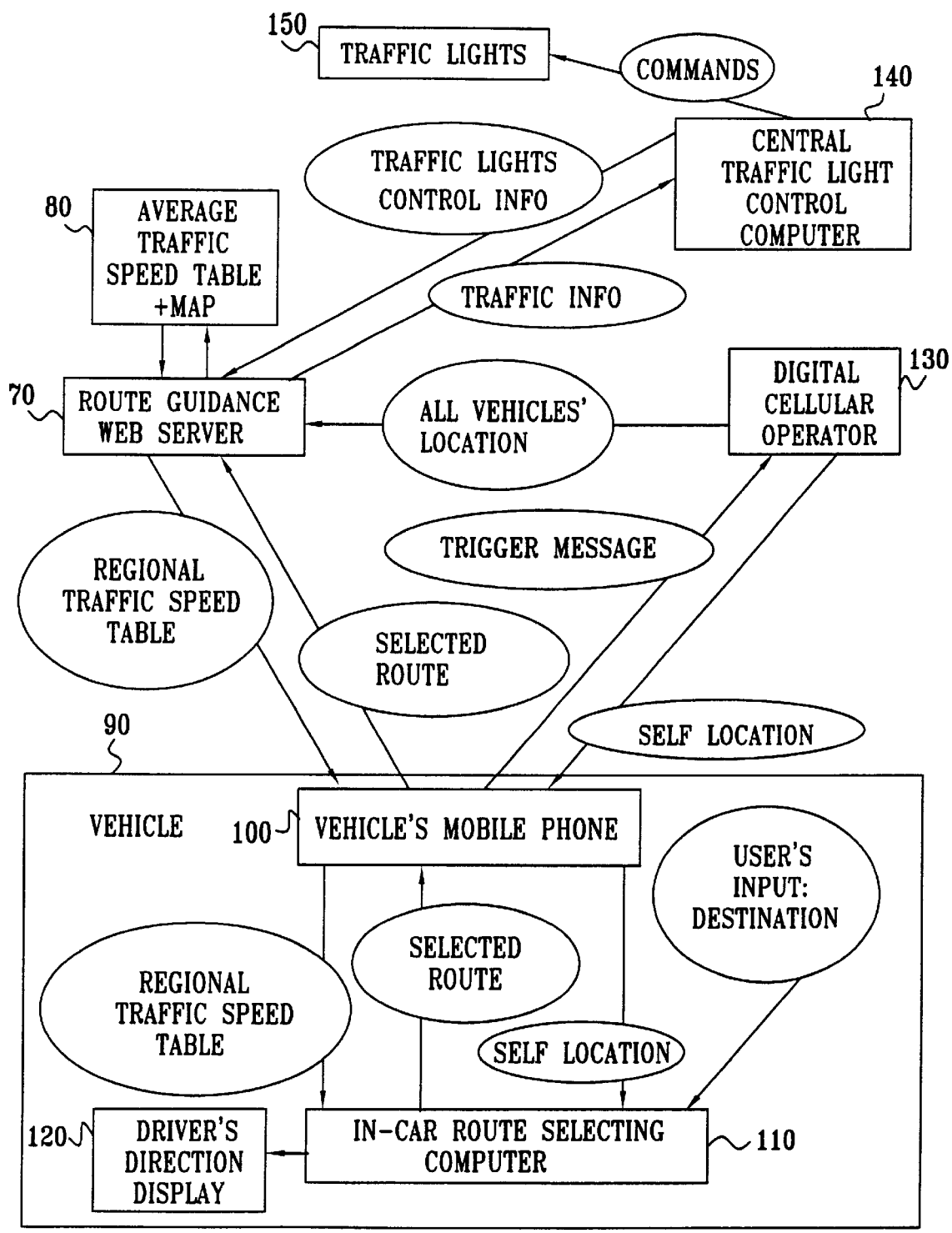
FIG. 2 is a semi-pictorial semi-block diagram illustration of a driving route guidance system implementing the data flow of FIG. 1 and constructed and operative in accordance with a first preferred embodiment of the present invention.

Reference is now made to FIG. 2 which is a semi-pictorial semi-block diagram illustration of a driving route guidance system implementing the data flow of FIG. 1 and constructed and operative in accordance with a first preferred embodiment of the present invention. In FIG. 2, each vehicle computes its own route as well as, preferably, its own estimated arrival time. It is appreciated that the route guidance web server need not necessarily be a web server and may alternatively comprise a non-web server.

Figure 3:
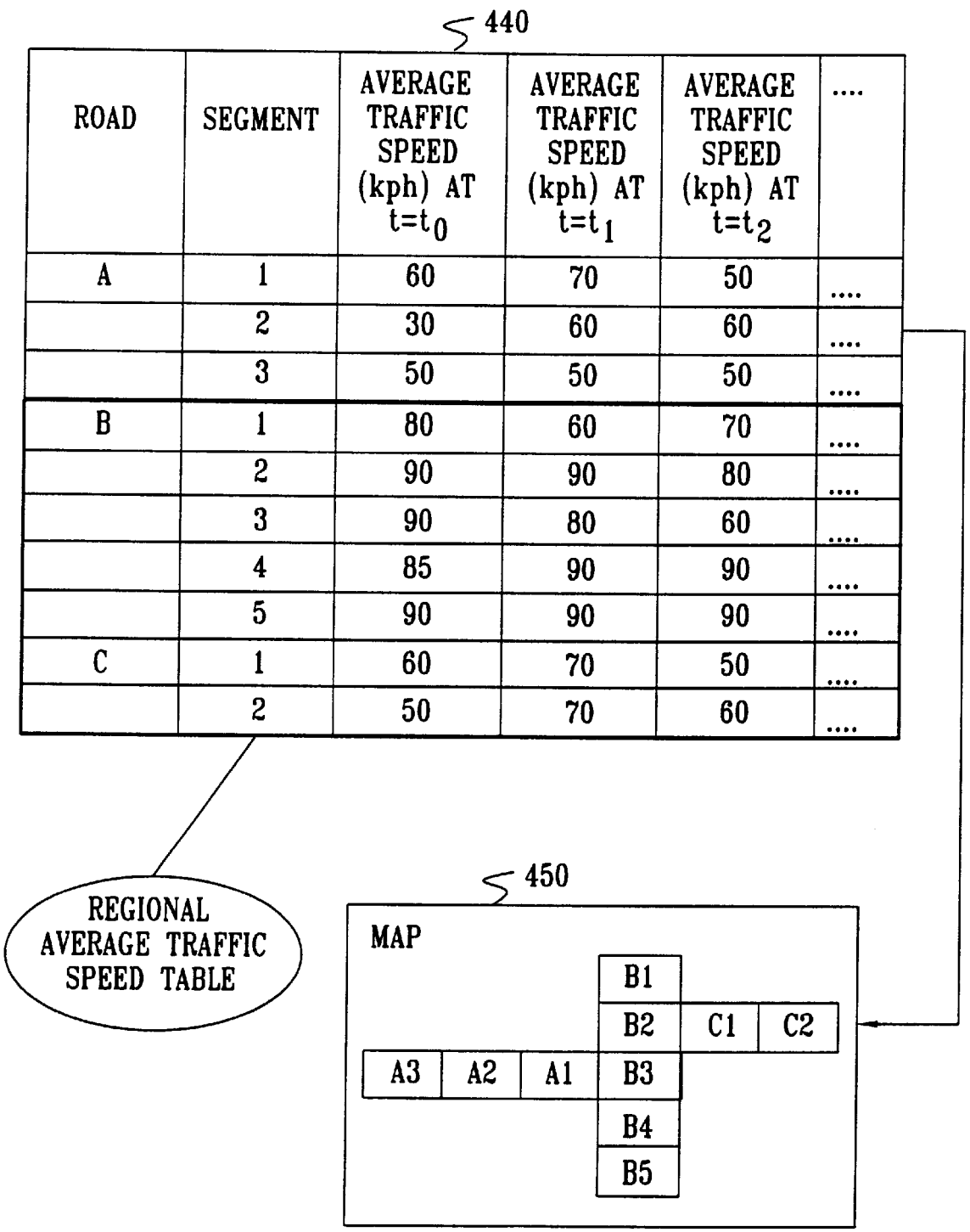
FIG. 3 is a diagrammatic illustration of a preferred implementation of the average traffic speed table +map of FIG. 2.

Reference is now made to FIG. 3 which is a diagrammatic illustration of a preferred implementation of the average traffic speed table+map of FIG. 2. The map of FIG. 3 may be stored in any suitable format or representation such as a graph representation or such as a bitmap. The map preferably includes detailed information regarding each road and each segment of each road typically including some or all of the following information: road width, length, number of lanes, topography, surface quality.

Figure 9:
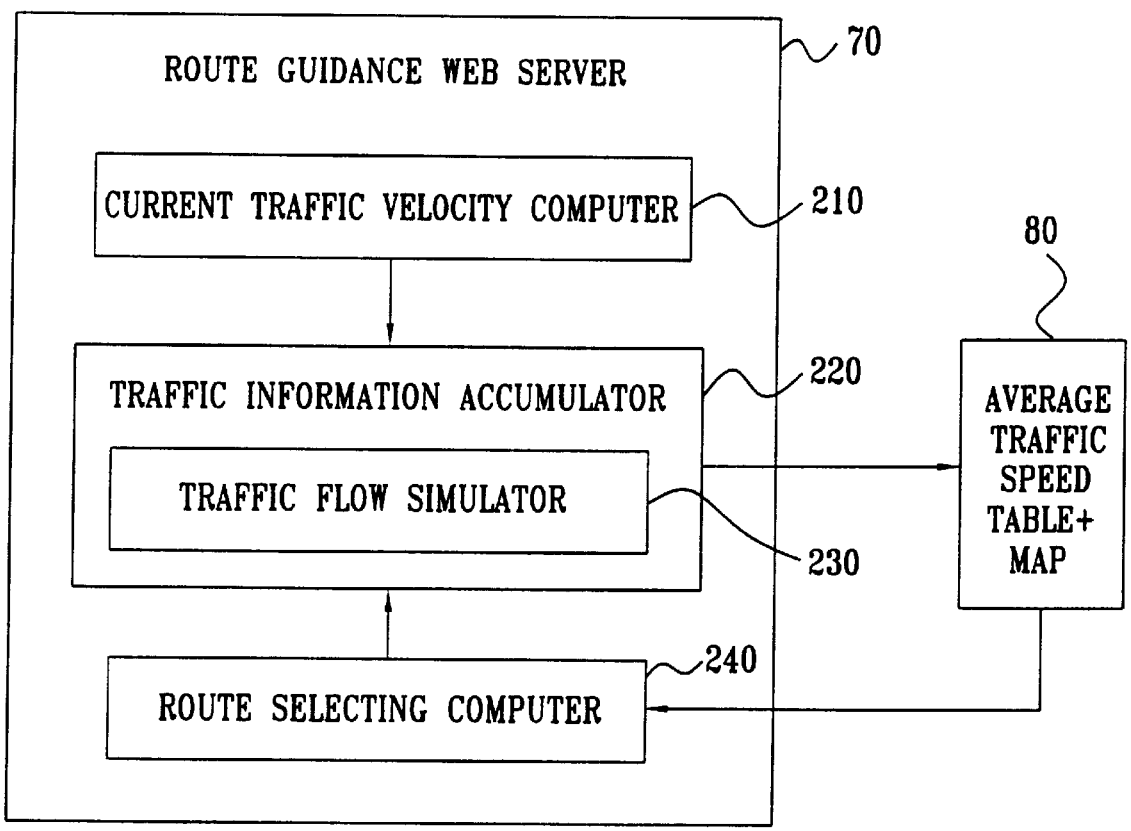
FIG. 9 is a simplified functional block diagram illustration of the route guidance server of FIG. 4, constructed and operative in accordance with a preferred embodiment of the present invention.

The traffic flow simulator of FIG. 9 employs the map of FIG. 3 when computing the anticipated average traffic velocity in each road and each segment of each road.

Any desired regional traffic speed table may be sent to a vehicle from the average traffic speed table may be sent to a vehicle from the average traffic speed table by selecting the contents of the table which pertain to a particular region in which the vehicle is travelling, the region comprising certain roads each of which includes one or more segments.

If communication with vehicles is cellular and if the cellular communication system provides a cell-based message broadcasting capability, supported e.g. by a short message system (SMS)), then the network of roads, and hence the table, are preferably divided into regions which correspond to the cells. Thereby, the same regional table or tables may be broadcast to all vehicles within a particular cell, which reduces the communication burden. Typically, more than one regional table is broadcast to vehicles within a particular cell. Specifically, the regional tables of that cell and all its cell neighbors may be broadcast to the vehicles within the cell, in order to anticipate a situation in which a vehicle crosses from cell to cell.

Figure 4:
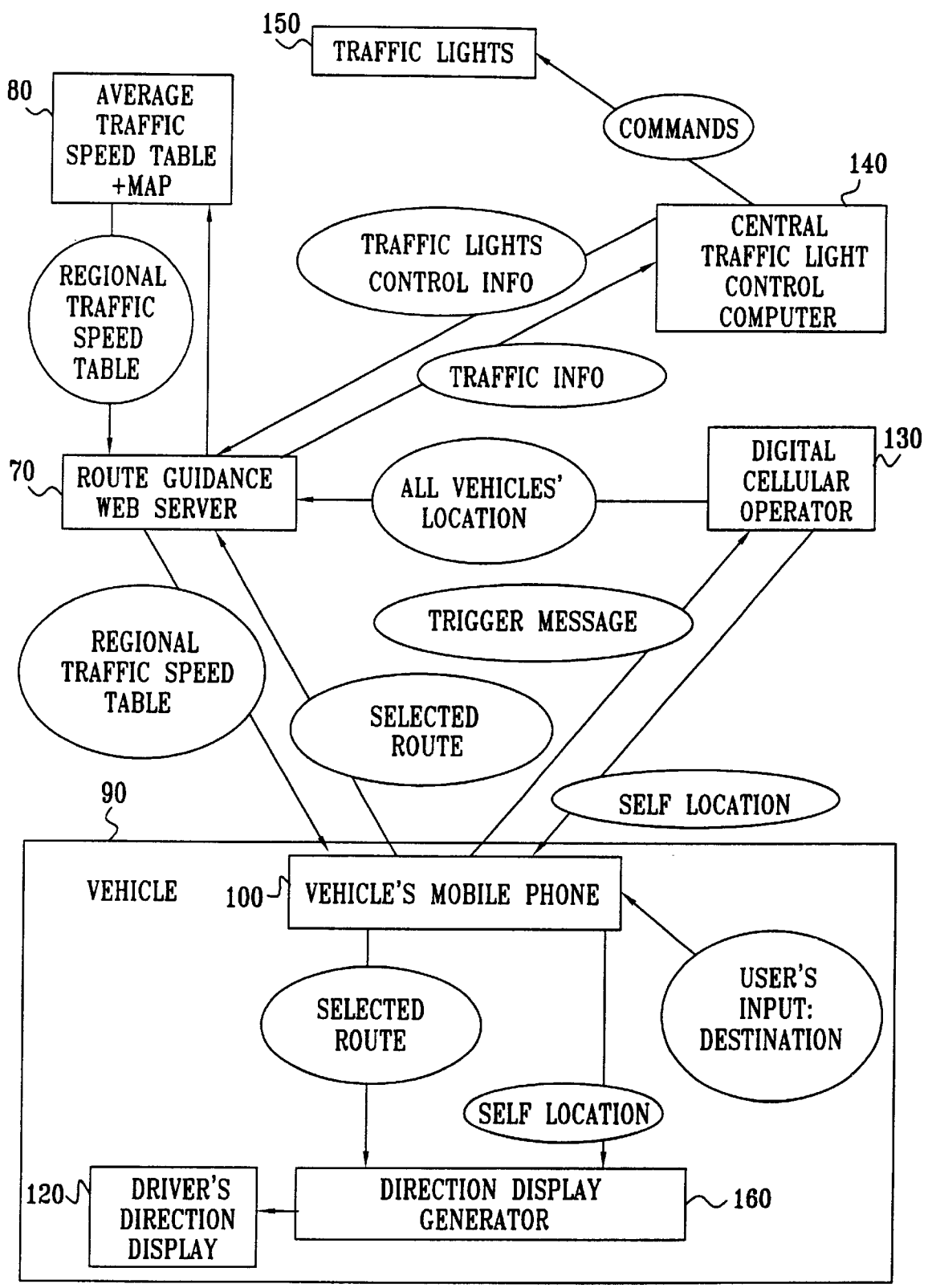
FIG. 4 is a semi-pictorial semi-block diagram illustration of a driving route guidance system implementing the data flow of FIG. 1 and constructed and operative in accordance with a second preferred embodiment of the present invention.

Reference is now made to FIG. 4 which is a semi-pictorial semi-block diagram illustration of a driving route guidance system implementing the data flow of FIG. 1 and constructed and operative in accordance with a second preferred embodiment of the present invention. In FIG. 4, the server computes routes and, optionally, estimated arrival times, rather than each vehicle doing so as in FIG. 2.

Reference is now made to FIG. 5 which is a self-explanatory simplified flowchart illustration of an individual driver's interaction with the route guidance system of FIG. 2. As shown, the in-car computer typically does not receive the entire average traffic speed table but only a subset thereof pertaining to territory which the vehicle may wish to traverse. The size of the region is typically selected to be large enough such that all information pertaining to the contemplated trip is transmitted to the in-car computer by the route guidance server.

FIG. 6 is a simplified flowchart illustration of an individual driver's interaction with the route guidance system of FIG. 4.

Reference is now made to FIG. 7 which is a self-explanatory simplified flowchart illustration of an individual traffic light control computer's interaction with the route guidance system of the present invention.

Figure 8:
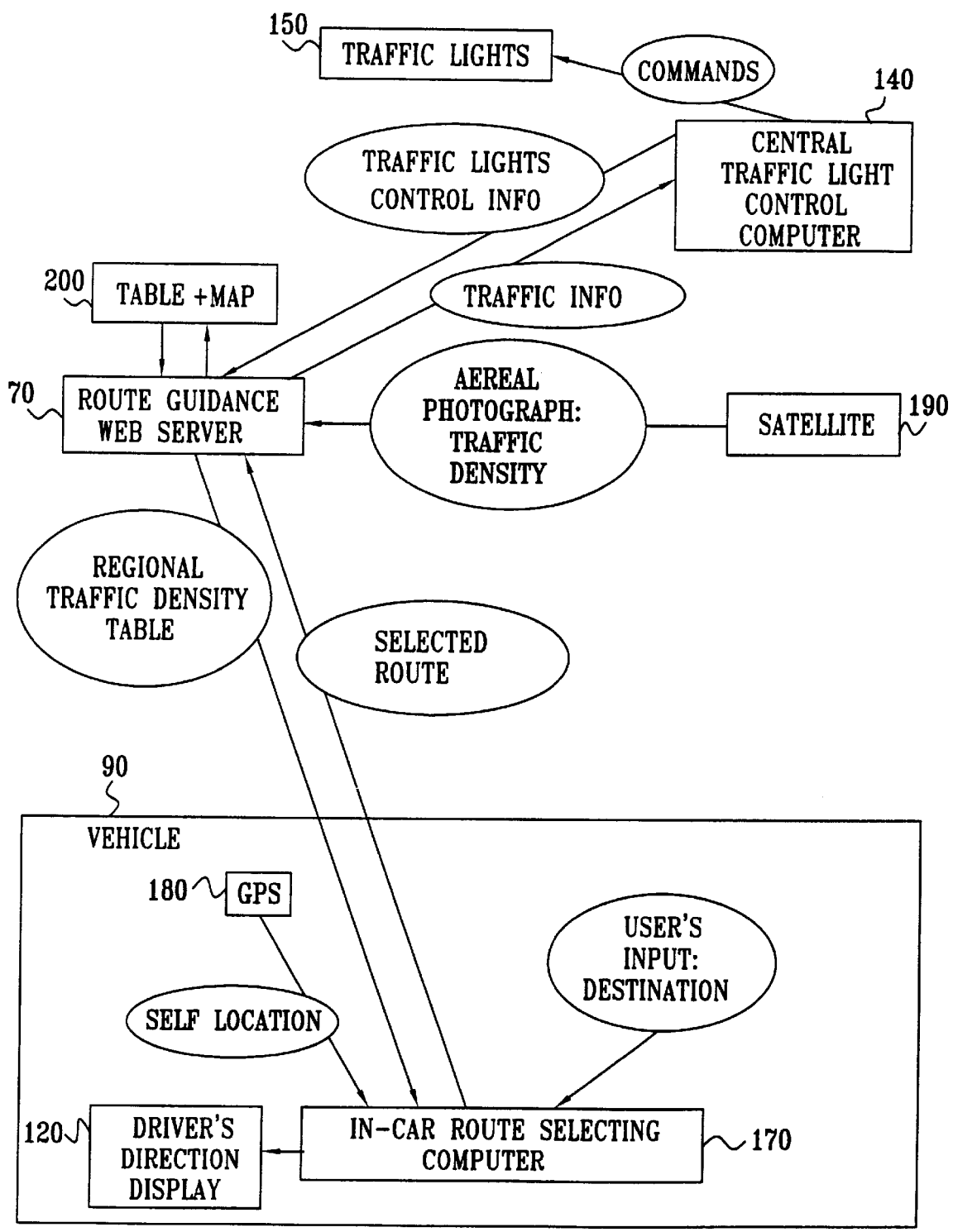
FIG. 8 is a simplified semi-pictorial semi-block diagram illustration of a route guidance system constructed and operative in accordance with a preferred embodiment of the present invention which employs aerial photographs to derive traffic information such as traffic density information, the system communicating with vehicles via satellite.

FIG. 8 is a simplified semi-pictorial semi-block diagram illustration of a route guidance system constructed and operative in accordance with a preferred embodiment of the present invention which employs aerial photographs to derive traffic information such as traffic density information, the system communicating with vehicles via satellite.

The embodiment of FIG. 8 differs from the embodiment of FIGS. 2 and 4 in that:

a. The source of traffic information is aerial photographs rather than or in addition to ground-based and/or vehicle originated sources;

b. The type of traffic information comprises traffic density information rather than or in addition to velocity information, and c. Communication of the central system with the vehicles is via satellite rather than or in addition to cellular communication.

It is appreciated that any of the features of FIG. 8 may be incorporated in isolation or in combination with any other feature into the embodiments of either FIG. 2 or FIG. 4.

FIG. 9 is a simplified functional block diagram illustration of the route guidance server of FIG. 4, constructed and operative in accordance with a preferred embodiment of the present invention. The route guidance server of FIG. 2 may be similar except that the route selection unit is eliminated since route selection is performed by the in-car computer of the individual vehicles.

Figure 10:
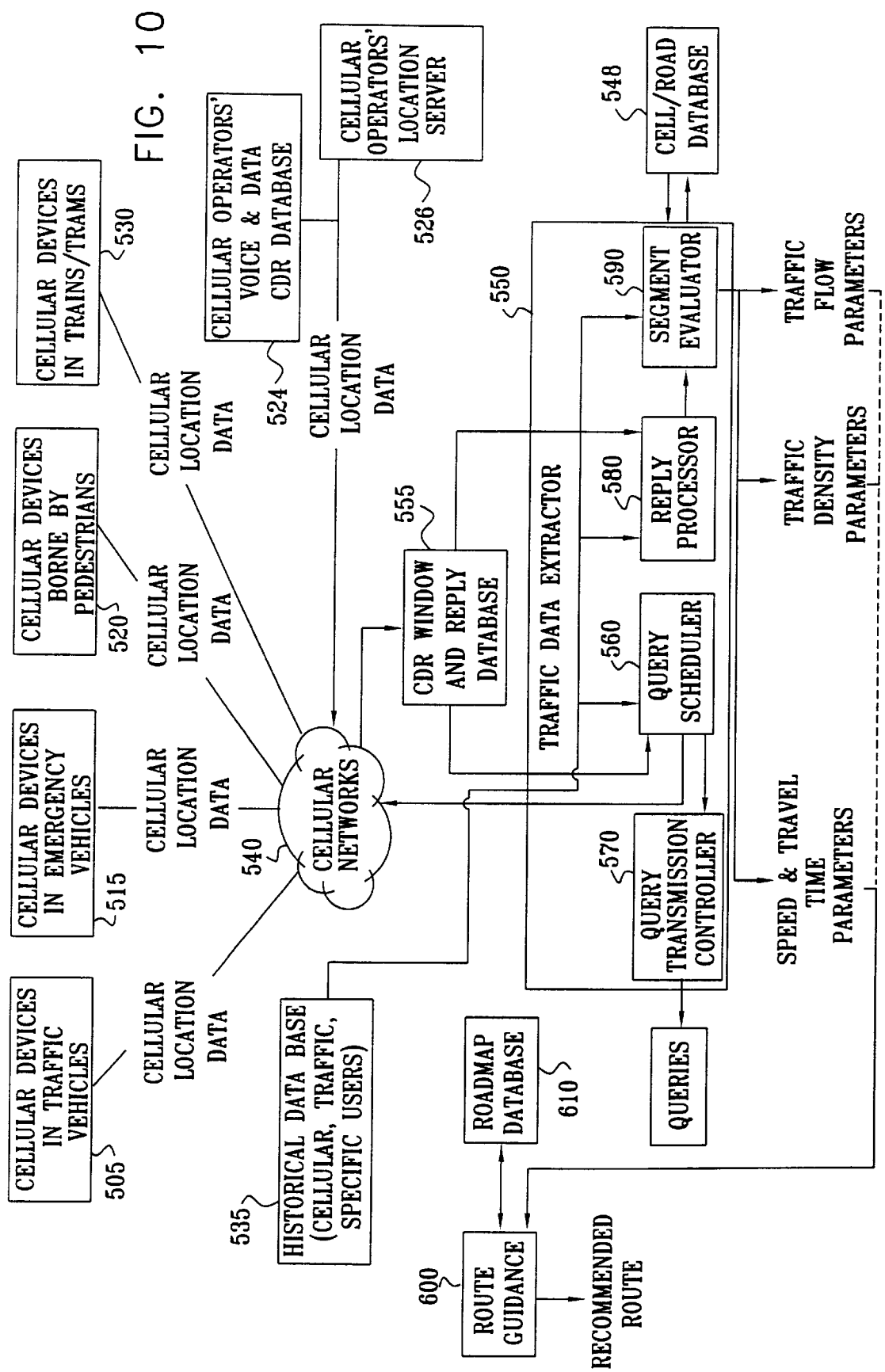
FIG. 10 is a simplified block diagram illustration of a traffic data collection constructed and operative in accordance with a preferred embodiment of the present invention.

FIG. 10 is a simplified functional block diagram of a traffic data collection and route guidance system constructed and operative in accordance with a preferred embodiment of the present invention. As shown, a traffic data extractor 550 is operative to receive information regarding a population of users of mobile communication devices, which population may be served by one or more cellular networks 540 operated by one or more cellular operators. The population of users from which the traffic data extractor 550 receives information may include one, some or all of the following types of users: vehicles 505 which may or may not include motorcycles, wherein the vehicles 505 in combination constitute traffic, emergency vehicles 515 which are not necessarily representative of or bound by traffic, pedestrians and other non-motor vehicles 520 such as bicycles, and tracked motor vehicles 530 such as trains or trams.

The traffic data extractor 550 preferably receives inputs, such as indications of locations of mobile communication devices, from one or more central CDR (voice or data transmission) databases 524 typically belonging to one or more cellular operators serving the population of mobile users. The traffic data extractor also preferably receives inputs, such as indications of locations of mobile communication devices, from one or more location servers 526 typically belonging to one or more cellular operators.

A cell/road database 548 is provided which serves as another input to the traffic data extractor 550 of FIG. 10. The cell/road database 548 stores data relating the cellular information characterizing the geographical area covered by the system, to the road information characterizing the same area. According to one embodiment of the present invention, the cell/road database comprises the tables of FIGS. 11A, 11B, 11D and 11I described in detail below.

Preferably, a historical database 535 is provided. The historical database 535 typically stores a log of historical traffic data much of which is no longer in effect and historical data derived from the log. Typically, the historical database 535 includes one or both of the following types of information:

a. user location information comprising, for each mobile communication device from which readings have been received, the ID of that device and each of the readings received, each with its own time-stamp. Typically, this information is stored in the tables of FIGS. 11E, 11G and 11J, described in detail below.

b. road traffic information comprising, for each road on which vehicles have been found to travel, and the velocity profiles computed for that road, each profile being stored with its own time-stamp. Typically, this information is stored in the tables of FIGS. 11F, 11K and 11H, described in detail below.

Location information available to the system is stored in a CDR window and reply database 555 in the illustrated embodiment. The location information stored in database 555 typically comprises not only replies to queries but also location information accumulated routinely, without recourse to queries, e.g. voice and data CDR records from CDR database 524, a window of which is preferably routinely sent to the CDR window and reply database 555. This window is stored, in the illustrated embodiment, in the table of FIG. 11C which is part of the CDR window and reply database 555.

Figure 12:
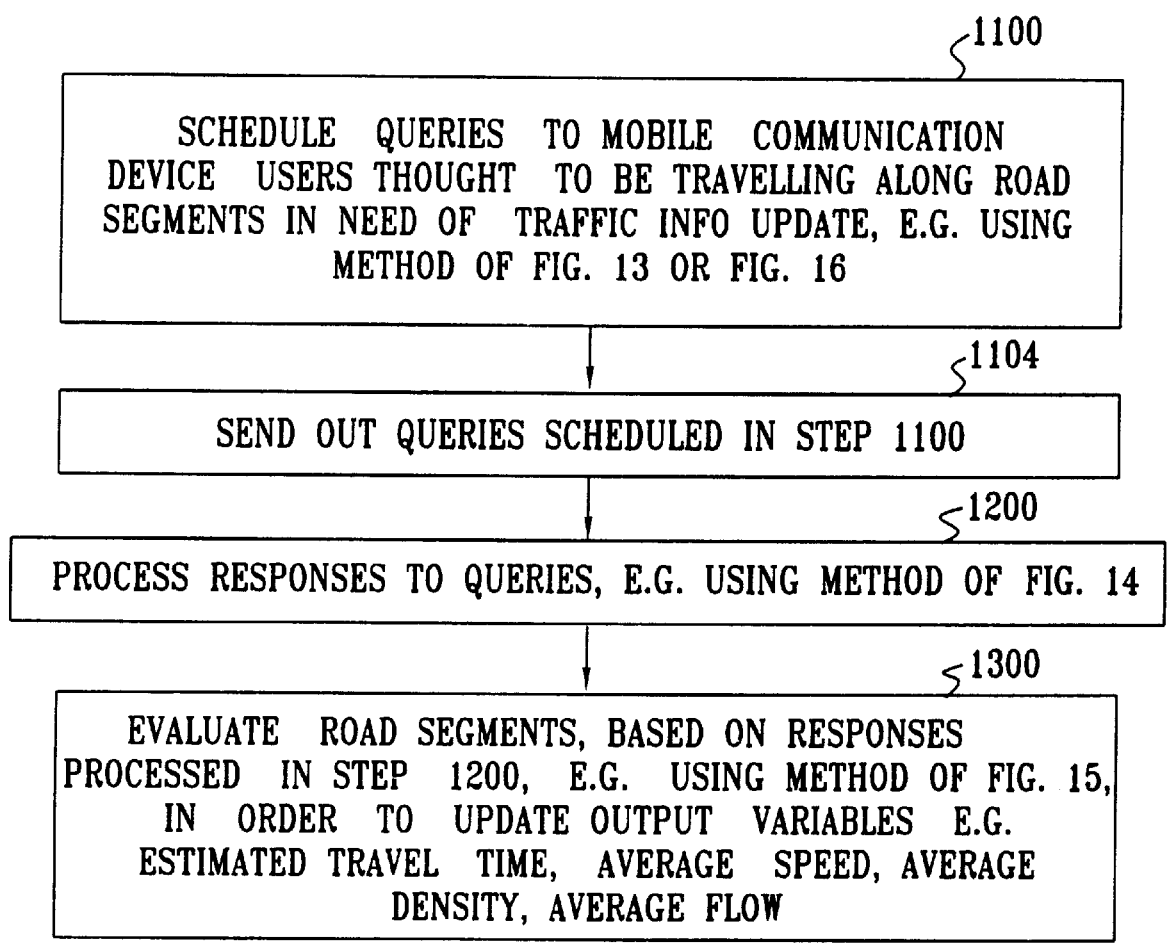
FIG. 12 is a simplified flowchart illustration of a preferred method of operation for the system of FIG. 10.

The traffic data extractor 550 preferably performs the functions described in detail herein with reference in FIG. 12 and preferably comprises several processors operating in parallel. According to the illustrated embodiment, the traffic data extractor 550 comprises the following parallel processors: a query scheduler 560, a query transmission controller 570, a reply processor 580 and a segment evaluator 590 of FIG. 10 which typically perform steps 1100, 1104, 1200 and 1300 of FIG. 12, respectively.

Any suitable method may be employed to generate data regarding each individual road within the geographical area covered by the system of the present invention. Information collected regarding a particular road may comprise an indication of the name of the road, and a sequence of fields representing a sequence of locations, typically evenly spaced, along the axis of that road. This data may, for example, be used to generate the data of the tables of FIGS. 11A–11B.

Typically, some or all of the following information is collected regarding each of the sequence of locations:

a. The GPS coordinates of that location or other coordinates defining the location in terms of a grid or other coordinate system spanning the area of coverage;

b. The ID of the mobile communication cell or cells serving that location. Preferably, the probability of service for each of the cells serving that location is stored;

c. The number of lanes in the road at that location;

d. The distance from that location, along the road, to the beginning of the road i.e. to the first location in the sequence of locations.

e. Other physical characteristics of the location which may affect traffic e.g. slope, road quality.

Preferably, a two-way road is represented as two separate sequences of locations corresponding respectively to the two directions of traffic motion along the two-way road although alternatively, the two-way road may be presented as a single sequence of locations. Preferably but not necessarily, a multilane one-way road is represented using a single sequence of locations although alternatively, a separate sequence of locations may be used to represent each lane.

As shown, the output of the traffic data extractor 550 typically comprises, for each road segment, traffic parameters characterizing the traffic over that road segment, typically including travel time parameters, speed parameters, density parameters and flow parameters.

Preferably, a route guidance unit 600 is provided which uses at least some of the output parameters of the traffic data extractor 550 in order to compute a recommended route responsive to a user or system query typically comprising an indication of an origin from which the user is leaving and an indication of a destination at which the user wishes to arrive. The route guidance unit 600 also employs roadmap data stored in a roadmap database 610.

A preferred data structure for the roadmap database 610 is described hereinbelow with reference to FIGS. 18A–18C. A preferred method of operation for the route guidance unit 600 is described hereinbelow with reference to FIG. 19.

Reference is now made to FIGS. 11A–11K which, taken together, form a simplified representation of a preferred data structure for the historical database 535, cell/road database 548 and CDR window and reply database 555 of FIG. 10.

It is appreciated that the specific data structure and representations of the mobile communication cell layout and road layout illustrated in FIGS. 11A–11K are merely exemplary and are not intended to be limiting. Any alternative representation of the mobile communication cells within the area covered by the system of the present invention may be employed. Also, any alternative representation of the roads within the area covered may be employed. Also, any alternative data structure may be employed to represent the relationship between the road layout and the cell layout. Examples of alternatives to the data structure shown and described particularly herein include but are not limited to the following which may be employed separately or in combination:

a. the cell data and road data may be stored separately,
b. data may be collected by defining a grid or polar coordinate system covering the geographical area of interest and storing information regarding each box of the grid and/or each row and column of the grid, and/or each azimuthal section of the polar coordinate system, rather than or in addition to storing information along the roads as in the illustrated embodiment;
c. communication cell data may comprise stored indications of each cell's boundaries rather than or in addition to each cell's intersections with each road,
d. the geographical area of interest may be represented topographically, e.g. such that each intersection of two or more roads is considered a node, and/or such that each road/cell intersection is considered a node.

FIGS. 11A–11K are now described in detail.

FIG. 11A is an example of a segment characteristics table whose number of records is typically equal to the number of road segments in the geographical area covered by the system of the present invention. The segment characteristics table of FIG. 11A stores characteristics of each road segment including fixed characteristics such as the name, importance (Im) and length of each segment and situational, temporally varying characteristics such as the time required to traverse the segment under current traffic conditions, the average speed of vehicles travelling on the road segment, the average density of vehicles on the road segment, the average flow of vehicles over the road segment, and the degree of need to update the situational characteristics.

The term "importance" is a subjective value typically used by the system in order to prioritize the roads in terms of which roads should be updated most frequently. Typically, the importance values are assigned by the system designer and may for example reflect roads which are heavily travelled, and/or roads which are very sensitive to situational variables, and/or roads which are known to be bottlenecks to general traffic patterns throughout the area and/or roads which currently suffer from a high communication load which renders the updates received from users travelling on these roads, less reliable due to the high instance of "distant cell service", i.e. of a user being served by a communication cell in which the user does not, in fact, reside.

Typically, the fixed characteristics are entered into the table during set-up whereas the situational characteristics are typically initially set to represent a free flow situation, i.e. a situation in which all vehicles are travelling at maximal allowed speed. The situational characteristics are modified in the course of operation of the system of the present invention, as described in detail below with reference to step 1300 of FIG. 12.

FIG. 11B is an example of a segment-cell characteristics table typically including one record for each intersection between cells and road segments in the geographical area covered by the system of the present invention. For example, the first record relates to an area which is the intersection of a road segment whose ID is 1, and a cell whose ID is 45A.

The table of FIG. 11B typically includes the following fields which are typically entered during set-up:

Segment ID—the ID of a segment to which the record pertains;

cell ID—the ID of a cell to which the record pertains. It is appreciated that, according to a preferred embodiment of the present invention, the system may simultaneously receive location data from more than one cellular network serving a single geographical area. According to this embodiment, the table of FIG. 11B may store records pertaining to intersections between road segments and cells from more than one cell network. This embodiment is facilitated by the fact that conventional cell IDs include an identification of the cell network to which they belong such that cell IDs are typically unique even if they belong to different networks.

Reference point—a location along the road segment, identified by its distance from the beginning of the segment, the location typically comprising an unbiased estimate of the location of a user given that he is located within the cell and segment whose IDs are stored within the record.

Cell size—The diameter of the communication cell. It is appreciated that the communication cell in fact does not have well-defined borders such that definition of cell size typically relies upon an arbitrary definition of the borders of the communication cell, such as the area in which 90 percent of transmissions directed to that cell are accurately received.

Cell segment probability—An estimate of the probability that a mobile user is travelling along the road segment identified by "segment ID" given that he is in the cell identified by "cell ID".

This field, which is typically the only field in the table which is not fixed, is initialized during set-up and is then updated periodically, e.g. every 15 minutes, using a suitable process such as the following:

a. The table of FIG. 11H is scanned and for each cell ID, a set of "recent records" is generated comprising all records for that cell ID having a time stamp larger than a predefined threshold characterizing the update.
b. Each "recent record" set is partitioned by the value of their "segment travelled" fields, into subsets of records. Each such subset corresponds to a cell-segment intersection.
c. For each subset, the number of records in the subset is divided by the total number of records in the "recent record" set to which the subset belongs. This quotient is stored in the table of FIG. 11B in the "cell segment" probability field of the record whose segment ID and cell ID match the segment-cell intersection to which the subset corresponds.

Association—whether the segment-cell intersection corresponding to the record is located at the beginning, middle or end of the road segment. Typically, each road segment is directional such that this field is meaningful.

The partitioning of the road segment into beginning, middle and end subsections is typically determined during set-up. The road segment may be partitioned or otherwise divided using any suitable method, e.g. by simply splitting its length into thirds. Alternatively, any other partitioning scheme which may be suitable for a particular application or geographical area may be employed. For example, if the traffic conditions are known to be generally uniform along a road segment, the beginning subsection may comprise substantially the entire road segment, in order to increase the sampling base for characterization of initial traffic behavior along the road segment.

FIG. 11C is an example of a current cellular location table in which each record is a time-stamped item of information indicating that a particular user is currently in a particular cell. Typically, the source of the information is stored. For example, the source of information may be the CDR (call data record) of the cell operator, or it may be a reply to a query directed to a cellular operator's location server, or it may be a location output generated by handsets of certain mobile communication devices. The table of FIG. 1C, and other tables which store historical information, such as the tables of FIGS. 11E and 11H, are typically purged of old records from time to time. In the illustrated embodiment, other tables are automatically rid of old records in the course of normal operation, however it is appreciated that this is a matter of designer's choice.

The table of FIG. 11C is typically initially empty and is filled during operation of the system of the present invention as described in detail below with reference to steps 1100 and 1200 of FIG. 12.

A CDR record of a single call made by a mobile communication device sometimes comprises more than one time-stamped location, typically two time-stamped locations pertaining respectively to the time-stamped locations of the mobile communication device at the beginning and end of the call. In this case, according to a preferred embodiment of the present invention, two records are added to the table of FIG. 11C, representing the locations of the mobile user at the beginning and end of the call, respectively.

FIG. 11D is an example of a travelled segment estimation table which is typically filled during set-up as described in detail below with reference to FIG. 17.

FIG. 11E is an example of a user travel habits table or users' travel log which is typically initially empty and is filled in the course of operation of the system of the present invention, as described below in detail with reference to step 1460 of FIG. 14.

The table of FIG. 11E is a users' travel log storing, for each reading or sample (including each reply), the segment ID at which the replying user was found to be located, and a time stamp indicating the time at which the reply occurred.

FIG. 11F is an example of a traffic history table which is typically re-generated periodically e.g. weekly. This table is used for rough evaluation of road segments if there is insufficient data such that the current characteristics of a road segment cannot be evaluated accurately.

FIG. 11G is an example of a users-along-segments table which is typically initially empty and generated in the course of operation of the system of the present invention, as described below in detail with reference to steps 1104 and 1200 of FIG. 12.

FIG. 11H is an example of a reply table which is used to generate the segment-cell characteristics table of FIG. 11B. The reply table of FIG. 11H stores the following information characterizing each reply received from a polled user:

the ID of the cell in which the polled user was located when he was selected, in step 1340, as a candidate for polling to whom a query should be scheduled; and the road segment over which the user is estimated to have been travelling when he replied to the query.

FIG. 11I is an example of an expected routes table. The table of FIG. 11I is built manually by the system planner during the set-up phase and stores information regarding a plurality of routes over which mobile users are predicted to travel. Each route comprises a sequence of one or more mutually adjacent road segments. In the illustrated example of FIG. 11I, the table stores information regarding three routes, the first two of which each include only a single segment and the third of which includes two road segments.

FIG. 11J is an example of a table of users' travel habits which is typically generated anew periodically e.g. weekly.

The table of FIG. 11J is typically generated by executing a set of suitable queries on the Table of FIG. 1E. Each query is intended to identify users having a particular travel habit. An example of a suitable query is "For each user X, find all segments (if any) that user X travelled over more than 3 times this week, between 7 AM and 8 AM". More generally, the structure of this query is: "For each user X, find all segments (if any) that user X travelled over more than (THRESHOLD VALUE DEFINING A HABITUAL JOURNEY) times this week/month/season/year, (WITHIN A SPECIFIC HABITUAL TIME PERIOD)".

FIG. 11K is an example of a segment characteristics log table which typically serves as a log for the segment characteristics table of FIG. 11A. The table of FIG. 11K is typically initially empty and is generated during operation of the system of the present invention, as described below in detail with reference to step 1540 of FIG. 15.

FIG. 12 is a simplified flowchart illustration of a preferred method of operation for the system of FIG. 10.

The method of FIG. 12 preferably includes the following steps:

Step 1100: Scanning all road segments within the geographic area covered by the system in order to select a subset of the road segments which is in most need of updating, identifying mobile communication device users which may be travelling along each of the road segments in the needy subset, and scheduling queries to these vehicles. "Updating" refers to updating of traffic parameters characterizing the current traffic situation in each road segment, including e.g. traffic speed parameters, traffic density parameters, travel time parameters and traffic flow parameters. The term "traffic speed parameters" includes all parameters which pertain to the speed of traffic on the road including but not limited to average speed or other central tendency parameters describing traffic speed such as median and mode, standard deviation of speed, minimum and maximum detected speeds, and speed percentiles. The terms "traffic density parameters", "travel time parameters" and "traffic flow parameters" include similar groups of parameters. In particular, "travel time parameters" can be expressed in terms of time of arrival when appropriate.

Generally, need for update is a function of the amount of time which has elapsed since the last update and the estimated reliability of the most recent update or updates. For example, a road segment which was updated recently, but the update was on the basis of a small number of reporting vehicles, may be deemed more in need of update than another road segment updated less recently, but on the basis of a large number of reporting vehicles. Another example is that to the extent that the update was performed on the basis of records pertaining to a large cell as opposed to a small cell, the update is considered relatively unreliable because a large cell leaves considerable uncertainty regarding the actual position of the mobile users within it.

Each query is typically recorded in the table of FIG. 11G. Preferably, only one type of query is sent out and the record of a query comprises an indication of the mobile user to whom the query was sent ("user ID" field), and a time stamp ("update time" field), indicating the time at which the query will be (for "pending" queries) or was (for "updated" i.e. past queries) sent out to the mobile user.

In step 1104, the queries scheduled in step 1100 are sent out.

Step 1200: Process incoming replies to queries, including matching replies to queries as recorded in step 1104, determining the segment or segments to which the query and its reply pertain, and preferably performing a preliminary evaluation of the reply.

Step 1300: For each segment within the geographical area covered by the system, update the traffic information regarding that segment based on the replies, pertaining to that segment, which have accumulated.

Preferably, steps 1100, 1104, 1200 and 1300 are performed by separate processors operating in parallel. Specifically, the query scheduler 560, query transmission controller 570, reply processor 580 and segment evaluator 590 of FIG. 10 typically perform steps 1100, 1104, 1200 and 1300 respectively.

Figure 13:
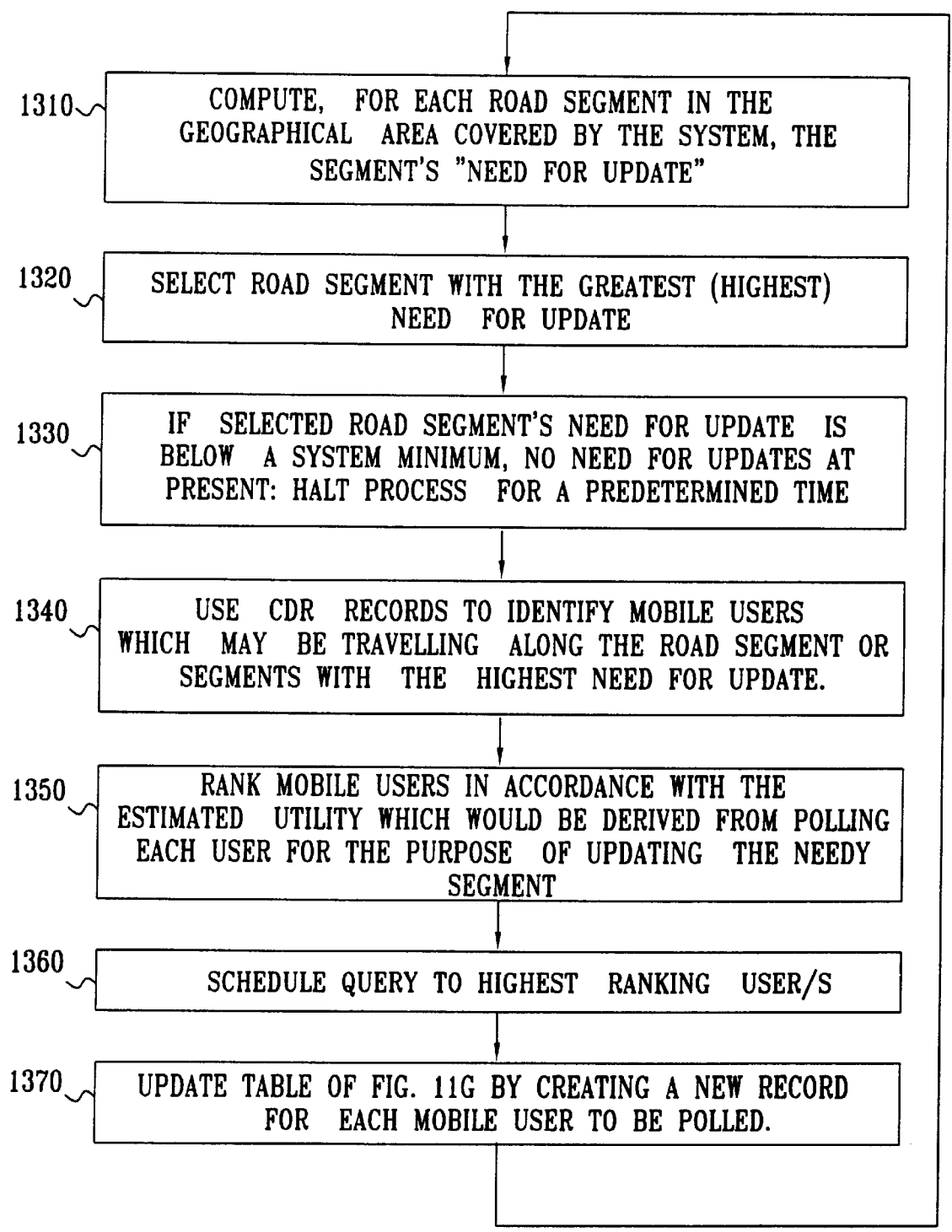
FIG. 13 is a simplified flowchart illustration of a method for performing the query scheduling step of FIG. 12 in accordance with a first preferred embodiment of the present invention.

Reference is now made to FIG. 13 which illustrates a preferred method for performing step 1100 of FIG. 12. As described above, step 1100 comprises scanning all road segments within the geographic area covered by the system in order to select a subset of the road segments which are in most need of updating. Typically, the subset comprises a single road segment in maximal need of updating which is selected using steps 1310 and 1320.

Step 1310 comprises computing, for each segment in the geographical area covered by the system, the segment's "need for update" $SI^2$. The computation is typically based on all records (users) i=1 ... n in the Table of FIG. 11G which pertain to the current segment. Each segment's "need for update" value is stored in the appropriate field in the Table of FIG. 11A, in the record corresponding to the segment in question.

A suitable formula for computing $SI^2$ is:

$$\sum_i [(f - dp_i)(k - \alpha t_i) / [\sum_i (k - \alpha t_i)(f - dp_i)]]^2 (CI_b^2 + CI_e^2) I_m / (Il)^2$$

where i=1, ... n=index of records in the table of FIG. 11G
$P_i$ is the p field of record i in the table of FIG. 11G.
f and d are weights for $P_i$ such as 0 and −1 respectively;
k, $\alpha$ are aging discounting parameters e.g. 300 and 1 respectively;
$t_i$ is the absolute difference between the current time and the time stored in the "update time" field of record i;
$CI_b$=value in "cell size" field of the Table of FIG. 11B for the record whose segment ID is the same as the segment ID of the current record in the table of FIG. 11G, and whose cell ID value is the same as the "begin cell" value of the current record in the table of FIG. 11G.

$CI_e$=value in "cell size" field of the Table of FIG. 11B for the record whose segment ID is the same as the segment ID of the current record in the table of FIG. 11G, and whose cell ID value is the same as the "end cell" value of the current record in the table of FIG. 11G. If the current record's "end cell" field is empty, which may occur particularly for pending records, because the end cell is not yet known, then $CI_e$ may be taken to be the average of all cell sizes in the table of FIG. 11B of those records which correspond to the segment whose ID is stored in the current record of FIG. 11G, and which are associated to the end of that segment.

Il=Absolute difference between the "reference point" values of the following two records:

the record whose segment ID is the same as the segment ID of the current record in the table of FIG. 11G, and whose cell ID value is the same as the "begin cell" value of the current record in the table of FIG. 11G; and the record whose segment ID is the same as the segment ID of the current record in the table of FIG. 11G, and whose cell ID value is the same as the "end cell" value of the current record in the table of FIG. 11G.

If the "end cell" field, in the candidate's record in the table of FIG. 11G, is empty, which may occur particularly for pending records, because the end cell is not yet known, then Il may be taken to be the absolute difference between:

the "reference point" value of the record whose segment ID is the same as the segment ID of the current record in the table of FIG. 11G, and whose cell ID value is the same as the "begin cell" value of the current record in the table of FIG. 11G; and the "segment length" value, in the table of FIG. 11A, in the record corresponding to the road segment whose need for update is being evaluated.

Im=the value stored in the importance field of the needy segment in the Table of FIG. 11A.

Step 1320: Select, in the table of FIG. 11A, the road segment with the greatest (highest) need for update.

Step 1330: If the selected road segment's need for update is below a system minimum such as 0.1, no need for updates at present: halt process for a predetermined time e.g. 1 minute, then recommence.

Step 1340: Identify mobile users which may be travelling along the road segment or segments with the highest need for update. This step is typically performed as follows:

Find, in the Table of FIG. 11B, all cells which intersect the beginning of the most needy road segment. This is typically accomplished by recording the "cell ID" field of any record in the table of FIG. 11B whose "segment ID" field is the same as the segment ID of the needy road segment identified in (b) and whose "association" field equals "begin".

For each cell found to intersect the beginning of the most needy road segment, identify, in the Table of FIG. 1C, all users who recently were found to be within that cell. This is typically accomplished by scanning the records of the Table of FIG. 11C for each such intersecting cell, for users whose cell ID is the same as that of the intersecting cell and whose time stamp differs by 15 minutes (e.g.) or less from the current time. Record the user IDs of these users, for all intersecting cells.

Step 1350: The mobile users are typically ranked in accordance with the estimated utility which would be derived from polling each user for the purpose of updating the needy segment. Each user whose user ID was recorded is a candidate to be polled for the purpose of updating the needy segment. For each such candidate, an expected update utility is computed, i.e. the expected benefit to be derived from that candidate, if he is chosen to be polled for the purpose of updating. the needy segment. Typically, each candidate's expected update utility is computed by performing the following steps (a), (b) and (c):

a. computing the "need for update" value of the needy road segment, based on the n users plus the candidate; and
  b. accessing the "need for update" value of the needy road segment, based on the n users without the candidate; and
  c. computing the difference between (a) and (b).

The highest ranking candidate (or a predetermined number of such) is selected to be polled.

In step (a), the above-described formula for "need for update" may be employed, however, the indices go from 1 to (n+1), where the (n+1)th member pertains to the candidate, and the parameters for the candidate are typically as follows:

$P_n+1$ is the travel probability of the candidate over the road segment whose need for update is being evaluated. This value may be computed as described herein for step 1370.

f and d are weights for $P_{n+1}$ such as 0 and −1 respectively;

k, α are aging discounting parameters e.g. 300 and 1 respectively;

$t_{n+1}$ is the absolute difference between the current time and the update time computed in step 1360, as explained in paragraph (b) of the description of step 1360.

$CI_b$=value in the "cell size" field of the Table of FIG. 11B for the record whose segment ID is that of the road segment whose need for update is being evaluated, and whose cell ID value is the same as the cell ID field in the record corresponding to the candidate in the table of FIG. 11.

$CI_e$=the average of all cell sizes in the table of FIG. 11B of those records which correspond to the segment whose need for update is being evaluated, and which are associated with the end of that segment.

Il=absolute difference between:
    the "reference point" value of the record whose segment ID is that of the road segment whose need for update is being evaluated, and whose cell ID value is the same as the cell ID in the record corresponding to the candidate in the table of FIG. 11C; and
    the "segment length" value of the road segment whose need for update is being evaluated, in the table of FIG. 11A.

Im=the value stored in the importance field of the needy segment in the Table of FIG. 11A.

Step 1360: A query is scheduled for the highest ranking candidate. Typically, the query scheduling step comprises providing the following information to the query transmission controller of FIG. 10:

a. The identity of the mobile user to be polled;
  b. The time at which the mobile user is to be polled. Typically, this time equals the estimated time at which the user to be polled will reach the end of the needy road segment. This time is computed by adding the estimated travel time over the needy road segment (the value stored in the "travel time" field of the record corresponding to the needy road segment, in the Table of FIG. 11A) to the time at which the mobile user to be polled was located (the time stamp of the mobile user to be polled, in the Table of FIG. 11C).

Step 1370: the Table of FIG. 11G is updated by creating a new record for the mobile user to be polled. The fields of the new record are as follows:

segment ID=of the needy segment
  user ID=of the mobile user to be polled
  status=pending. The "pending" records in the table of FIG. 11G each correspond to a query and each is eventually matched, in step 1200 of FIG. 14, to a reply. Typically, a query which is pertinent to several road segments is stored in several records, one for each road segment to which the query pertains.
  begin time=time stamp of the most recent record pertaining to the mobile user to be polled, in the table of FIG. 11C
  begin cell=cell ID of the most recent record pertaining to the mobile user to be polled, in the table of FIG. 11C
  update time=the time at which the mobile user is to be polled
  end cell=empty
  estimated travel probability p=the estimated probability that the mobile user in question is about to travel over the segment in question.

A preferred method for computing the estimated travel probability p is as follows:

a. The table of FIG. 11C is scanned to identify all records pertaining to the mobile user corresponding to the current user-segment pair and pertaining to a "recent past" time window, e.g. to the following time window: (2 hours before the current time−30 minutes before the current time).
  b. Access a table storing, for each cell ID, a north coordinate and an east coordinate positioning the cell ID within the geographical area covered by the system of the present invention. Using this table, find the north and east coordinates of each of the cells corresponding to each of the records identified in step (a).
  c. Using the same table, find the north and east coordinates of the cell identified by the "begin cell" field of the record pertaining to the current user-segment pair.
  d. Compute the distance between the location defined by the north and east coordinates accessed in step (c), and between each of the locations similarly defined in step (b). For each location defined in step (b), divide the distance value by the difference between:
    the "begin time" field of the record in the table of FIG. 11G corresponding to the current user-segment pair; and
    the "time stamp" field of the corresponding record in the table of FIG. 11C.

This difference represents the time which has elapsed since the user was detected in some other cell. Therefore, the quotient constitutes a rough estimate of the speed at which the user has recently been travelling.

e. If one or more of the speeds computed in step (d) is lower than a system threshold value such as 10 kph, the mobile user is suspected of being a pedestrian and his estimated travel probability is set low, typically to 0.

Otherwise, i.e. if the mobile user is believed to be a vehicle, the mobile user's habitual travel periods, if any, are accessed from the table of FIG. 11J. If the user is found to have a habitual travel period which encompasses the current time and which pertains to the current segment, then the estimated travel probability is set high, typically to 1.

Otherwise, the estimated travel probability is set to the cell-segment probability of the record, in the table of FIG. 11B, which matches both the segment ID of the current user-seg-ment pair and the cell ID of the record in the table of FIG. 11G whose begin cell corresponds to the current user-segment pair.

Figure 14:
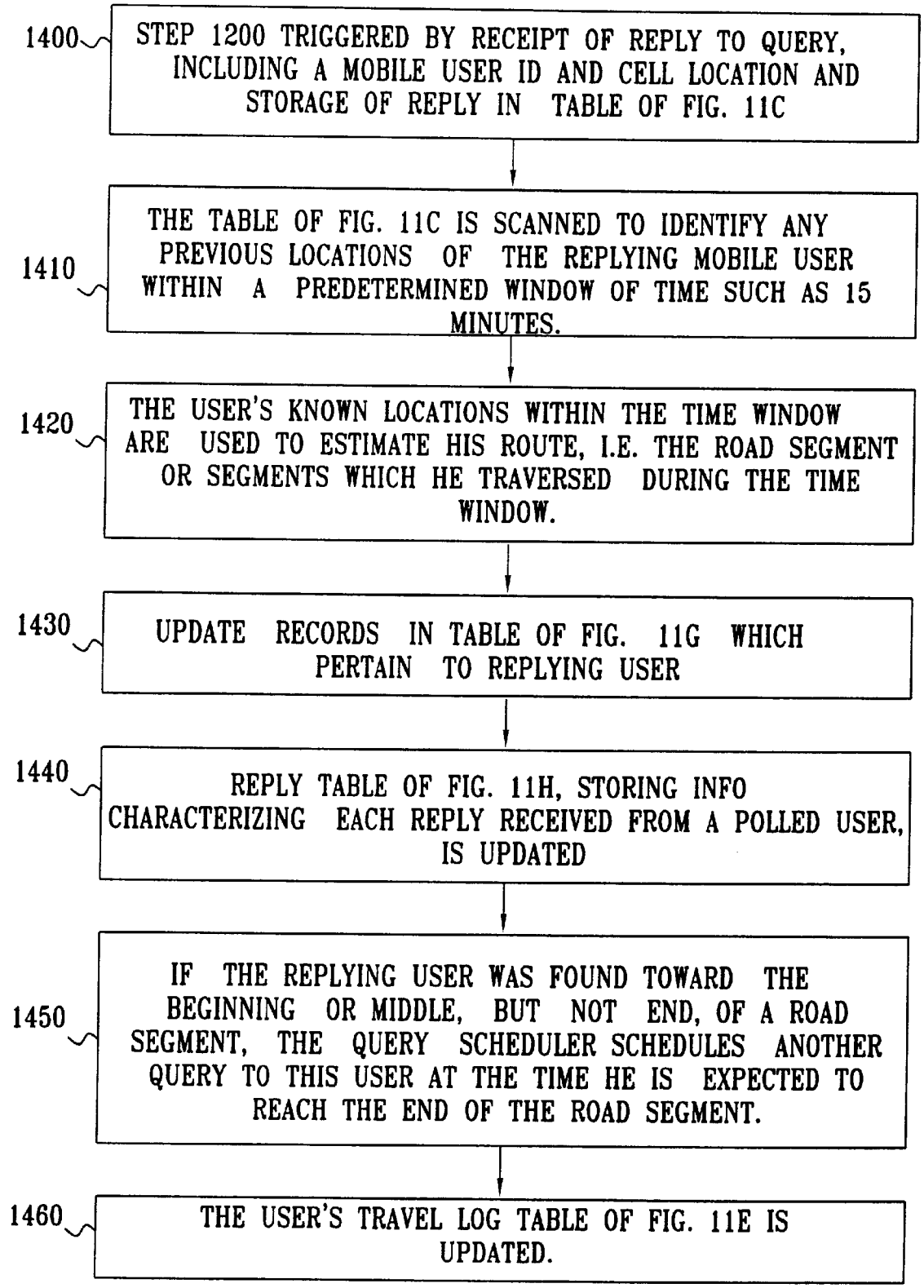
FIG. 14 is a simplified flowchart illustration of a preferred method for performing the reply processing step of FIG. 12.

FIG. 14 is a simplified flowchart illustration of a preferred method for performing the query processing step 1200 of FIG. 12. As described above, step 1200 comprises processing incoming replies to queries, including:

matching replies to queries which, in step 1370 were recorded as "pending" records in the table of FIG. 11G, determining the segment or segments to which the query and its reply pertain, and, preferably, performing a preliminary evaluation of the reply.

The method of FIG. 14 preferably includes the following steps:

Step 1400: Step 1200 is triggered by receipt of a reply to a query, the reply including the ID of the mobile user who is replying and his cell location. This information is stored in the table of FIG. 11C. In FIG. 11C, the "source" for this type of record is indicated to be "location server query reply".

Step 1410: The table of FIG. 11C is scanned to identify any previous locations of the replying mobile user within a predetermined window of time such as 15 minutes.

Step 1420: The user's known locations within the time window are used to estimate his route, i.e. the road segment or segments which he traversed during the time window. Typically, this step is performed by scanning the table of FIG. 11D for a single record whose first and last cells are the replying user's first and last known locations within the time window.

If no such record is found in the table of FIG. 11D, i.e. it is impossible to identify any road segments which the user travelled over during the time period, the reply is discarded because the user's route is probably a little traversed route.

If more than one such record is found in the table of FIG. 11D, the system attempts to rule out all but one of these records by comparing known interim locations of the user with the "second cell" and "third cell" fields of the records found.

When it is impossible to differentiate between two road segments over which the user might have travelled, lane-based differentiation may be used. One possible method for performing road differentiation based on lane detection is now described. The described method is believed to be suitable for use in scenarios where the traffic along two adjacent roads is not able to be differentiated either by utilizing the cellular coverage pattern along each one, or by associating a significant difference in the current traffic density with a known difference between one road and the other. The described method is believed to be suitable in the following scenario:

1. Two roads, which differ in their lane structure (e.g. a main road with 3 lanes [in each direction], and a side road with 1 lane).
2. Heavy or moderately heavy traffic along the roads, causing almost all of the vehicles to advance in "convoys" each along its specific lane, seldom switching from one lane to another, with similar average travel speed. If the traffic is not even moderately heavy, the flow along that road is free or close to that, hence, enabling the use of other differentiation methods (e.g. relative density) or making differentiation unnecessary altogether if both roads are open.
3. Existence of the ability to receive accurate data regarding the position of the traveling vehicles (e.g. events of crossing from one cell to another, or GPS). The readings are assumed to be available at a relatively high rate (e.g. once every cell crossing or once every few hundred meters).

A car overtaking detection method is now described. When a large sample of vehicles report their accurate location at a relatively high rate, it is possible to detect events in which one vehicle overtook another. This may be accomplished by comparing the readings of all pairs of cars along the sampling time period. If one vehicle in a pair was initially ahead of another, and at some point the second car moved ahead, then it is determined that an overtaking has occurred.

A method for vehicles sample partition based on overtaking is now described. After comparing all the relative positions of pairs of vehicles along the relevant time period, and all the events in which one car overtook another is determined, an undirected graph is built which is characterized as follows:

Each vertex in the graph represents one vehicle in the sample.

Each edge (x, y) between 2 vertices is constructed if and only if the pair of vehicles (x and y) did not overtake one another throughout the whole time period.

The vertices are then partitioned into sub-graphs ("cliques") that are defined as containing vertices, in which each pair of vertices within them are connected by an edge. The intuitive description of these cliques is a group of vehicles characterized in that none overtook any another. In other words, each clique represents vehicles travelling in a single lane. This state represents a vehicle "convoy", or vehicles traveling in one lane. During moderately heavy and heavy traffic, lanes advance a synchronously, so that from time to time some vehicles from one lane overtake others in other lanes, whereas within the lane there is no overtaking. To summarize, we can say that each clique represents vehicles traveling in one lane.

A method for differentiation between road segments, based on lanes, is now described. After partitioning all the sampled vehicles into "lane cliques", an average speed for each lane or clique is computed.

Next, the different lane speeds are examined, and if they can be divided into two significantly different groups of cliques this is done. This situation is expected to exist since speeds of lanes of the same road are expected to be close, and hence if 2 roads differ in their speed, they will generate 2 groups of cliques with different speeds.

Finally, the new groups are associated with the roads. This may be accomplished by matching the number of cliques in each new group with the number of lanes in one of the roads.

Referring back to FIG. 14, steps 1430 onward are now described.

Step 1430: Whether or not the reply was discarded, the table of FIG. 11G is now updated. In the update, each pending record whose "user ID" field indicates that the record pertains to the replying user is updated. Updated records, and pending records pertaining to users other than the replying user are not updated. The update comprises the following operations:

All pending records pertaining to the replying user (i.e. all records whose status field is "pending" and whose "user ID" field contains the ID of the replying user) are deleted. All of deleted records have the same "begin time" and "begin cell" and "update time" because they all pertain to the same user.

New records are constructed as follows:

If the replying user was found, in step 1420, to have travelled along a single road segment, then a new record is added to the table of FIG. 11G and its fields are set as follows:

segment ID represents the single road segment along which the replying user travelled;

the "user ID" field stores the ID of the replying user;

the value of the "status" field is "updated";

"begin time", "begin cell" and "update time"—are given the same values they had respectively in the deleted records for the replying user;

"end cell" field is set to the cell ID in the reply.

The "estimated travel probability" field is typically emptied.

If the replying user was found, in step 1420, to have travelled along more than one road segment, then one new record is generated for each segment travelled and the "segment ID" field of each new record is filled accordingly. The remaining fields of the new records so generated are filled as above except for the "begin time" and "end time" fields which are defined as follows:

The "begin time" of the record pertaining to the first segment traversed by the replying user is the "begin time" in the deleted records.

The "end time" of the record pertaining to the last segment traversed by the replying user is the "end time" in the deleted records.

The "end time" of the record pertaining to the n'th segment traversed by the replying user is the "begin time" of the record pertaining to the (n+1)th segment traversed by the replying user.

The ratio of the intervals between each record's begin and end times is taken to be the ratio between the lengths of the road segments to which these records pertain. These lengths are stored in the table of FIG. 11A.

The "begin cell" of the record pertaining to the first segment traversed by the replying user is the "begin cell" in the deleted records.

The "end cell" of the record pertaining to the last segment traversed by the replying user is the "end cell" in the deleted records.

The remaining "begin cell" fields are set as follows: Find all records in the table of FIG. 11B whose segment ID corresponds to the segment ID of the record in question. From among these records, select the record having the smallest reference point i.e. the record pertaining to the cell which is closest to the beginning of the road segment.

The remaining "end cell" fields are set as follows: Find all records in the table of FIG. 11B whose segment ID corresponds to the segment ID of the record in question. From among these records, select the record having the largest reference point i.e. the record pertaining to the cell which is closest to the end of the road segment.

Step 1440: The reply table of FIG. 11H is updated.

As described above, the reply table of FIG. 11H is intended to store the following information characterizing each reply received from a polled user:

the ID of the cell in which the polled user was located when he was selected, in step 1340, as a candidate for polling to whom a query should be scheduled; and the road segment over which the user is estimated to have been travelling when he replied to the query.

Therefore, the update comprises adding a new record representing the reply which has just been processed. The fields of the new record are filled as follows:

Time stamp—the "update time" of any of the records pertaining to the replying user.

Begin cell ID—the "begin cell" value of any of the records pertaining to the replying user.

Segment travelled—If the table of FIG. 11G now includes only one record pertaining to the replying user, use the "segment ID" value of that record. If there is more than one such record, use the "segment ID" value of the record having the earliest "begin time".

If, in step 1420, it is impossible to identify any road segments which the user travelled over during the time period, then a value indicating non-relevance is entered in the "segment travelled" field.

Step 1450: If the replying user was found toward the beginning or middle, but not end, of a road segment, the query scheduler schedules another query to this user at the time he is expected to reach the end of the road segment. Typically, the expected time is computed based on the time which the replying user required to reach the point within the road segment at which he is currently located.

Step 1460: The table of FIG. 11E is updated. As described above, the table of FIG. 11E is a users' travel log storing, for each reading or sample (including each reply), the segment ID at which the replying user was found to be located, and a time stamp indicating the time at which the reply occurred. In step 1460, a new record is added to represent the reply which has just been processed.

Figure 15:
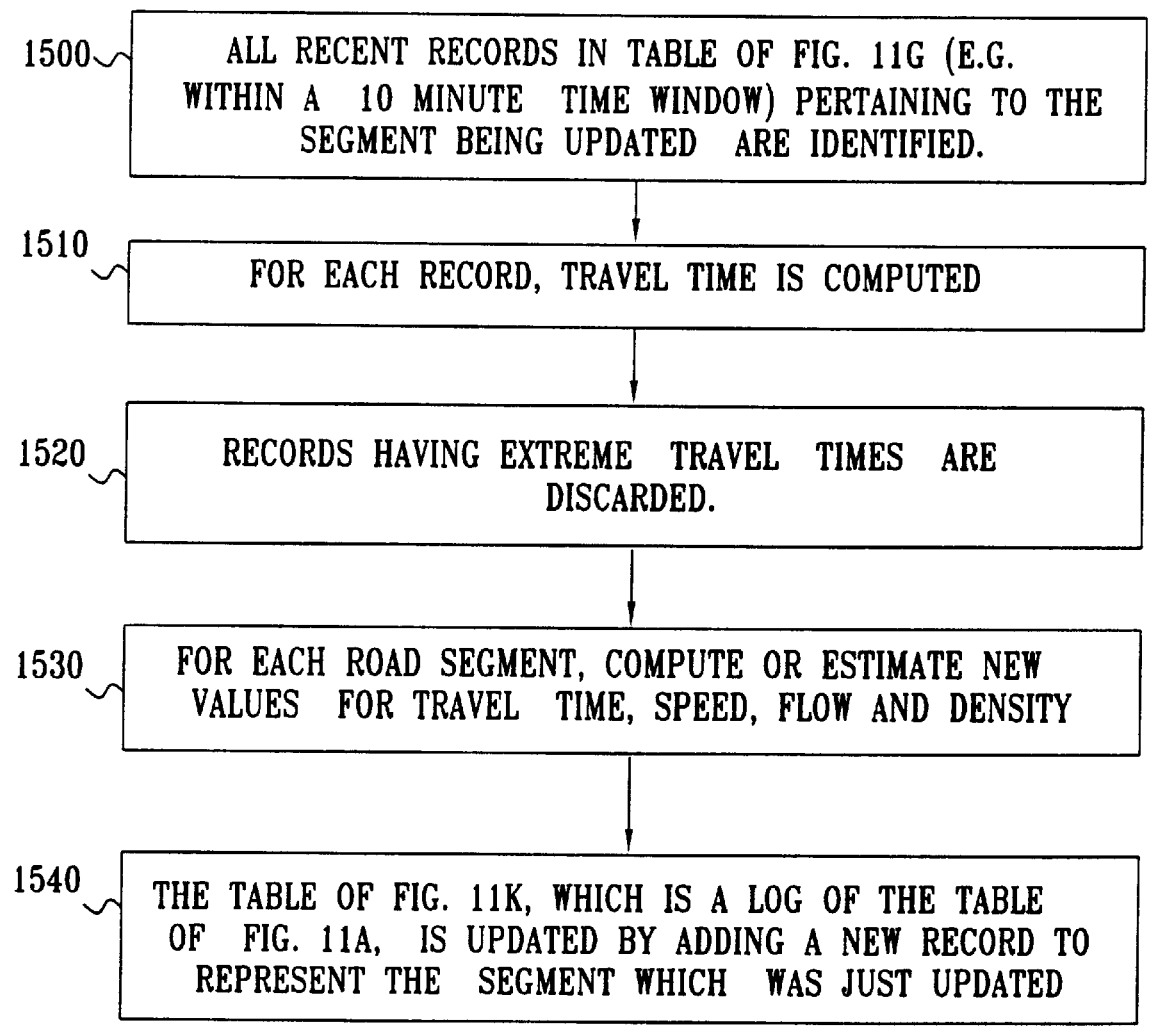
FIG. 15 is a simplified flowchart illustration of a preferred method for performing the segment evaluation step of FIG. 12.

Reference is now made to FIG. 15 which is a simplified flowchart illustration of a preferred method for performing the segment evaluation step 1300 of FIG. 12. As described above, in step 1300, traffic information is updated, by the segment evaluator 590 of FIG. 10, for each segment within the geographical area covered by the system, based on the replies, pertaining to that segment, which have accumulated. Typically, the segment evaluator is activated periodically, e.g. every 2–5 minutes, and upon each activation, it updates the traffic information which has accumulated for each segment in the geographical area covered by the system, one segment after another.

The updating process for each segment typically comprises the following steps:

Step 1500: the Table of FIG. 11G is scanned and all recent records (e.g. within a 10 minute time window) pertaining to the segment being updated are identified.

Step 1510: For each record, a "travel time" is computed by computing the difference between the record's "begin time" and update time fields and dividing by the difference between the reference points (as stored in the table of FIG. 11B) of the record's begin cell and end cell. The quotient is typically multiplied the segment's total length stored in the table of FIG. 11A.

Step 1520: Records having extreme travel times are discarded. For example, the top and bottom quintiles may be discarded, or records may be discarded if their travel times deviate by more than a single standard deviation from the mean travel time of the records identified in step 1500.

Step 1530: For each segment, compute new values for travel time, speed, flow and density and store these in the appropriate fields of the segment's record in the Table of FIG. 11A. The new travel time of the segment is typically the mean travel time of the records identified in step 1500. The new speed is typically the length of the segment, as stored in the table of FIG. 11A, divided by the mean travel time. The new flow and density are estimated based on the speed, employing mathematical models of traffic flow and density described in chapters 2.3.2 (flow) and 2.3.3. (density) of the above-referenced publication by Transportation Research Board's Revised Special Report, "Traffic Flow Theory", available at http://www/tfhrc.gov/its/tft/tft.htm. The computations for flow and density typically use road characteristics such as lane structure and length of the road.

Sometimes, an insufficient number of records (readings received from users travelling a particular road segment) have accumulated such that the travel time cannot be sufficiently accurately computed, or more generally, it may occur that the need for update is still high even though records have been accumulated. In this case, a travel time value is estimated using the Table of FIG. 11F. The Table of FIG. 11F is scanned to identify a record whose segment ID corresponds to that of the segment being updated and whose "time" corresponds to the current time.

The new speed of the segment is then taken to be the "typical travel speed" field of that record in the Table of FIG. 11F. The new density field is taken to be the "typical vehicle density" field of that record in the table of FIG. 11F. The new flow of the segment is taken to be the quotient of these two values, i.e. the new density divided by the new speed.

Step 1540: The Table of FIG. 11K, which is a log of the table of FIG. 11A, is updated by adding a new record to represent the segment which was just updated. The fields of the new record are filled as follows:

Segment ID—the ID of the segment just updated
Time—The current time
Travel time, speed, density and flow—The same values, respectively, stored in the table of FIG. 11A.

Figure 16:
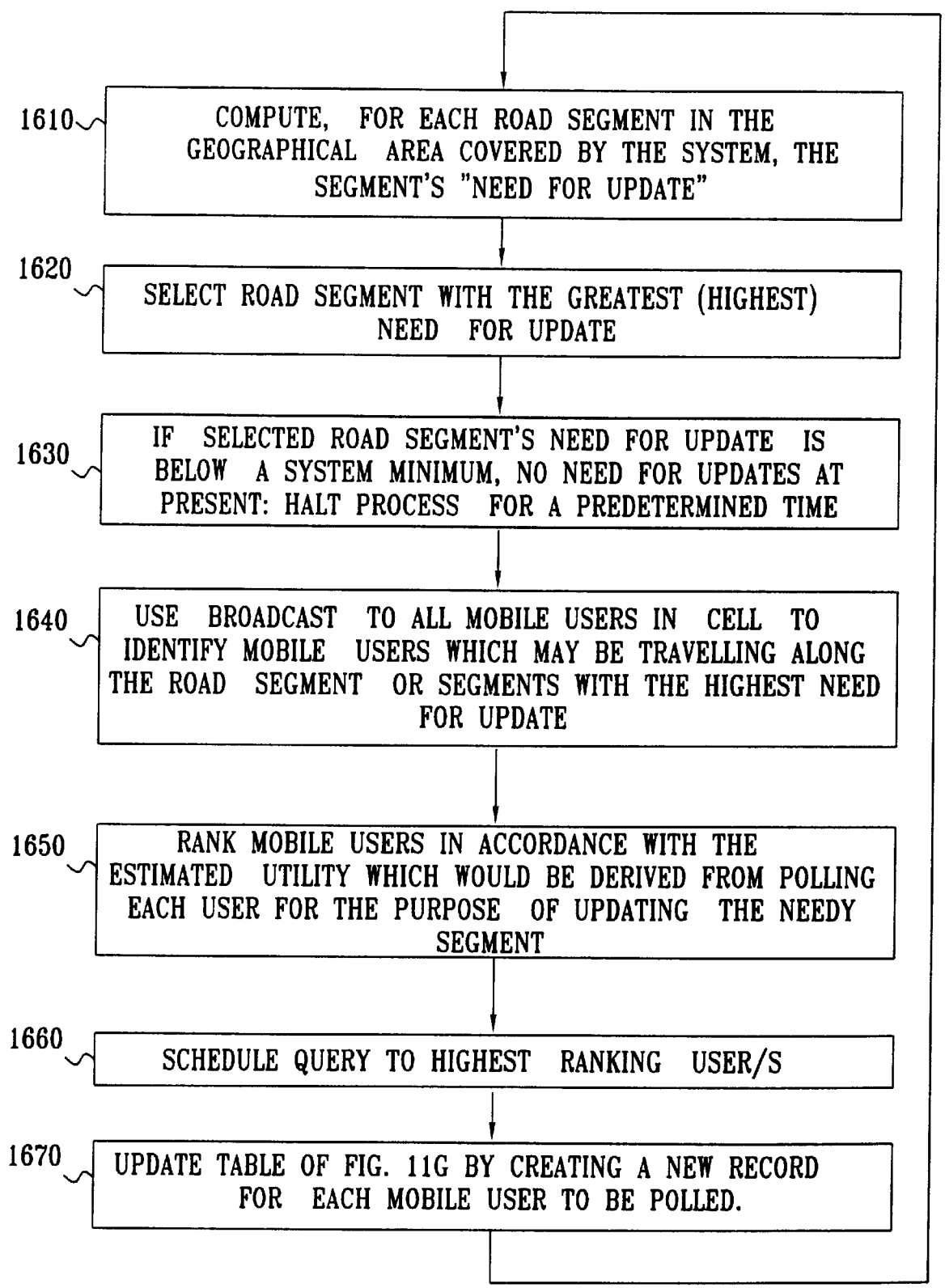
FIG. 16 is a simplified flowchart illustration of a method for performing the query scheduling step of FIG. 12 in accordance with a second preferred embodiment of the present invention.

Reference is now made to FIG. 16 which is a simplified flowchart illustration of a method for performing the query scheduling step of FIG. 12 in accordance with a second preferred embodiment of the present invention. The method of FIG. 16 is similar to the method of FIG. 13 except that step 1340 of FIG. 13 is replaced by step 1640.

As described above, step 1340 comprises identification of mobile users which may be travelling along the road segment or segments with the highest need for update. Step 1340 is typically performed by relying on CDR records in the table of FIG. 11C, as described above.

Step 1640 typically relies on a broadcast to all mobile users within a particular cell, which results in a set of replies identifying all mobile users in the cell. The embodiment of step 1640 is suitable if a sufficient proportion of the mobile users are equipped with handsets having STK applications or similar applications which are capable of initiating replies to a broadcast "answer me" transmission.

Step 1640 is typically performed as follows:

Find, in the Table of FIG. 11B, all cells which intersect the beginning of the most needy road segment. This is typically accomplished by recording the "cell ID" field of any record in the table of FIG. 11B whose "segment ID" field is the same as the segment ID of the needy road segment identified in (b) and whose "association" field equals "begin".

For each cell found to intersect the beginning of the most needy road segment, a cell broadcast is transmitted, typically immediately. The cell broadcast triggers an application within the handsets of the mobile users within the cell. This application is operative to initiate a reply transmission, e.g. an SMS (short message service)-formatted reply, containing the mobile user's ID, the ID of the cell in which it is located, and the current time. This message is received and the information it contains is entered in the table of FIG. 11C as a new record. The "source" field is assigned the value "handset location output".

Figure 17:
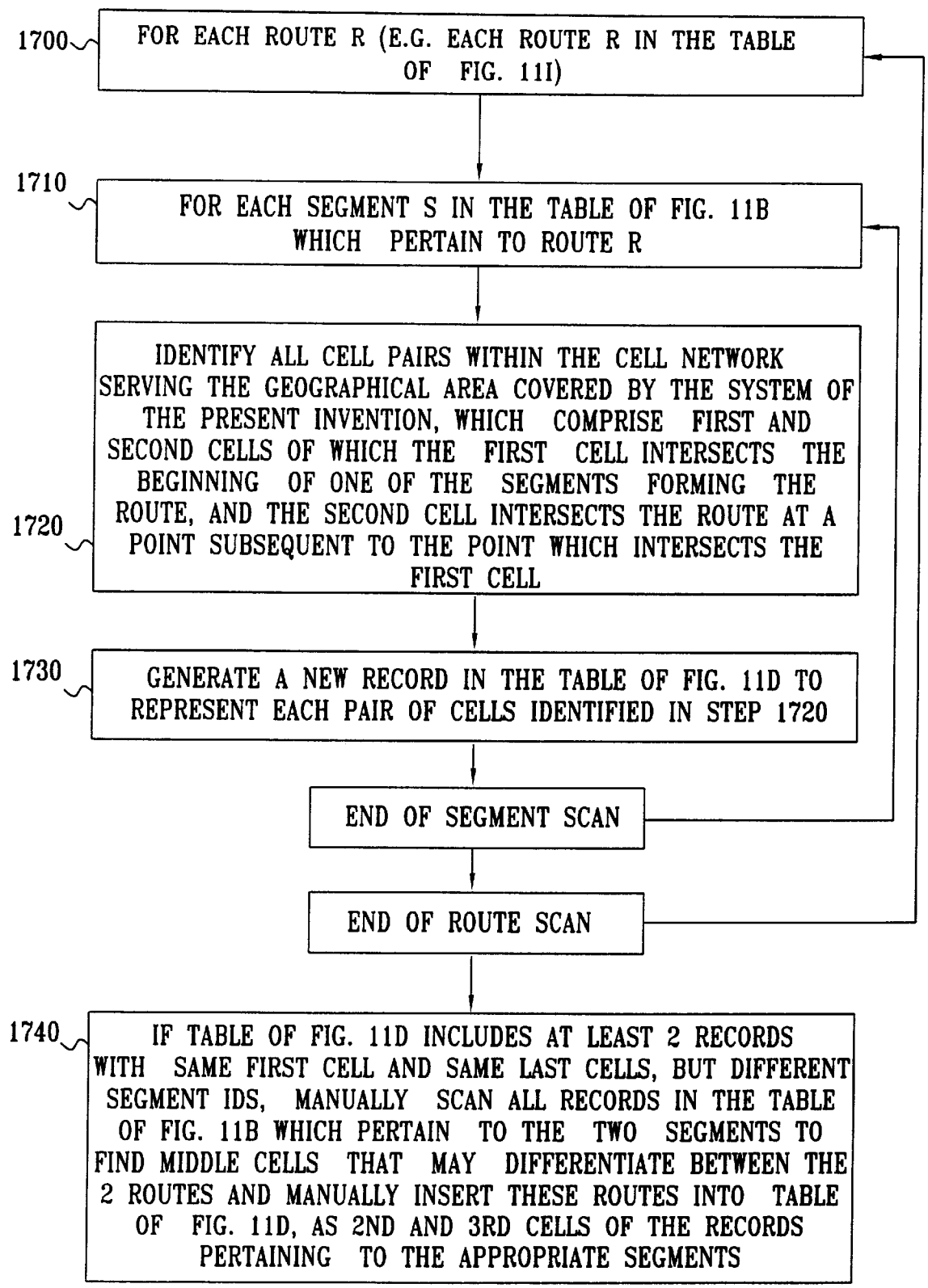
FIG. 17 is a simplified flowchart illustration of a preferred method for building the Table of FIG. 11D.

FIG. 17 is a simplified flowchart illustration of a preferred method for building the Table of FIG. 11D. The table of FIG. 11D is typically built based on the tables of FIGS. 11B and As described above, the table of FIG. 11I is built manually by the system planner during the set-up phase and stores information regarding a plurality of routes over which mobile users are predicted to travel. Each route comprises a sequence of one or more mutually adjacent road segments. In the illustrated example of FIG. 11, the table stores information regarding three routes, the first two of which each include only a single segment and the third of which includes two road segments.

A preferred method for generating the table of FIG. 11D comprises performing the following operations for each route:

Step 1720: Identify all cell pairs within the cell network serving the geographical area covered by the system of the present invention, which comprise first and second cells of which the first cell intersects the beginning of one of the segments forming the route, and the second cell intersects the route at a point subsequent to the point which intersects the first cell.

In other words, each pair of cells comprises first and second cells fulfilling all of the following criteria:

a. The first cell's association field in the table of FIG. 11B holds the value "beginning".

b. The first cell intersects the route at a segment having a particular "segment numbering" stored in the table of FIG. 11I.

c. The second cell intersects a road segment along the current route whose "segment numbering" exceeds the "segment numbering" of the segment intersecting the first cell; or The first and second cells intersect the route at the same segment and the "reference point" of the second cell, as stored in the table of FIG. 11B, is larger than the "reference point" of the first cell.

Step 1730: Generate a new record in the table of FIG. 11D to represent each pair of cells identified in step 1720, i.e. store each pair of cells identified in step 1720 as a new record in the table of FIG. 11D. The IDs of the first and second cells are stored in the "first cell" and "last cell" fields of new record in the table of FIG. 11D.

If both cells intersect the same segment, the "segment ID" field of the new record in the table of FIG. 11D is set to the ID of that segment. Otherwise, i.e. if the first and second cells intersect different segments of the route in question, store, in the "segment ID" field of new record in the table of FIG. 11D, a sequence of the segment IDs of all segments of the route from the segment intersecting the first cell to the segment intersecting the second cell, inclusive.

Step 1740: If table of FIG. 11D includes at least 2 records with same first cell and same last cells, but different segment IDs, manually scan all records in the table of FIG. 11B which pertain to the two segments to find middle cells (records whose association field stores the value "middle") that may differentiate between the 2 routes and manually insert these routes into table of FIG. 11D, as 2nd and 3rd cells of the records pertaining to the appropriate segments.

It is appreciated that the particular implementation shown and described above is merely exemplary of traffic data collection systems relying on cellular data and is not intended to be limiting. For example, according to an alternative embodiment of the present invention, each mobile user's location is not defined by the cell he currently occupies but rather by a pair of cells between which he is currently passing.

Therefore, in the table of FIG. 11B, for example, the "cell ID" column would be replaced by "old cell ID" and "new cell ID" columns and the "cell size" column might be replaced by a column representing the area of the overlap between the old and new cells, i.e. the cell that the user is currently exiting and the cell that the user is about to enter. The "cell-segment" probability column would typically be replaced by a column whose values represent the probability that a mobile user is located in a particular segment, given that he is currently crossing from a particular old cell to a particular new cell.

Similarly, in the table of FIG. 11C, the "cell ID" column would be replaced by "old cell ID" and "new cell ID" columns. In the table of FIG. 11D, this replacement would occur for the columns pertaining to each of the first, second, third and last cells. In the table of FIG. 11G, there would be "begin cell" and "end cell" columns for each of the old and new cells. In the table of FIG. 11H, there would be two "begin cell" columns, for the old and new cells respectively.

Alternatively, the "cell ID" field may be replaced by a field representing any of the following combinations:

cell ID concatenated with cell sector;

cell ID concatenated with time advance; or concatenation of cell ID, cell sector and time advance.

In the method of FIG. 12, each presentation of a query, whether to an individual mobile user or to all users within a particular cell, would be replaced by the following process:

A customized handset application is triggered, either by an individual transmission to a specific handset e.g. using SMS, or by a cell broadcast transmission. This application may run within the handset until the handset crosses from the cell it is currently travelling in, into another cell. At that point, the handset transmits a reply, containing the mobile user's ID, the IDS of the cell which he has most recently left and the cell he is now inhabiting and the current time. This message is received and the information it contains is entered in the table of FIG. 11C as a new record. The "source" field is assigned the value "handset location output".

Alternatively, a variation of the above customized handset application is triggered, again either by an individual transmission to a specific handset e.g. using SMS, or by a cell broadcast transmission. The variation application may run within the handset until the handset crosses from the cell it is currently travelling in, into another cell. At this point, a timer within the handset is initialized but no reply is transmitted. A reply is transmitted the next time the mobile user crosses between cells. At that point, the handset transmits a reply, containing the mobile user's ID, the IDs of all cells he has travelled into since a trigger was last received, and the time which has elapsed since the timer was initiated. As in the previous embodiment, this message is received and the information it contains is entered in the table of FIG. 11C as a new record. The "source" field is assigned the value "handset location output".

Alternatively, the handset application trigger may include an indication of the IDs of one or more pairs of adjacent cells and the application runs within the handset until the handset crosses between two cells, whose IDs are one of the pairs stored within the trigger.

According to still a further alternative, the handset application trigger may include an indication of the IDs of one or more foursomes of cells, each foursome including two pairs of adjacent cells (first and second adjacent cells; and third and fourth adjacent cells).

According to this alternative, the application runs within the handset until the handset crosses between two cells, whose IDs are listed as the first and second cells in an individual one of the foursomes stored within the trigger. At this point, a timer is initialized within the handset. If and when the handset crosses between the two cells whose IDs are listed as the third and fourth cells in the individual foursome, the handset transmits a reply and the table of FIG. 11C is updated. However, the reply, according to this embodiment, comprises the mobile user's ID, the IDs of the foursome of cells and the time which elapsed from the first-second cell crossing to the third-fourth cell crossing, as indicated by the timer in the handset.

According to still another further embodiment of the present invention, the handset application trigger may include:

an indication of the IDs of one or more foursomes of cells, each foursome including two pairs of adjacent cells (first and second adjacent cells; and third and fourth adjacent cells); and an indication of a time interval.

According to this alternative, the application runs within the handset until the handset crosses between two cells, whose IDs are listed as the first and second cells in an individual one of the foursomes stored within the trigger. At this point, a timer is initialized within the handset. If the handset crosses between the two cells whose IDs are listed as the third and fourth cells in the individual foursome, within the time interval stored in the trigger, then the handset does not transmit any reply.

Otherwise, i.e. if the handset crosses between the two cells whose IDs are listed as the third and fourth cells in the individual foursome, after the time interval stored in the trigger has already elapsed, then the handset transmits a reply and the table of FIG. 11C is updated. As in the previous embodiment, the reply, according to this embodiment, comprises the mobile user's ID, the IDs of the foursome of cells and the time which elapsed from the first-second cell crossing to the third-fourth cell crossing, as indicated by the timer in the handset.

It is appreciated that mobile location may be defined by more than one of the cells traversed by a user, in various ways and in particular, any suitable combination of the above embodiments may be employed.

It is appreciated that the system of the present invention need not be capable of accurately partitioning the entire set of mobile communication device users into traffic elements and users which are not traffic elements. It is sufficient for the system of the present invention to be capable of isolating, from among the mobile communication devices transmitting thereto, a set of traffic elements which is sufficiently large to satisfactorily serve as a sample of the total population of traffic elements.

Additionally, in accordance with a preferred embodiment of the present invention it is appreciated, that as part of the traffic data collection process, the system typically is capable of distinguishing between vehicles traveling along one of 2 roads which are so close to each other that they both pass through the same cellular cells. Any suitable method may be employed to assign such vehicles to one of the two roads, including but not limited to the following methods:

1. Lane-based differentiation as described in detail herein above.
2. Ambiguity may be resolved by considering the distance of the user's mobile device from the antenna (cellular time advance).
3. If a part of at least one of the 2 roads passes through at least one cell that is not shared with the other road, the system may looks for readings from that cell as described herein in detail with reference to step 1740 in FIG. 17.
4. Distinction between the 2 roads may be achieved initially, or ambiguity later resolved, by tracking the vehicles or looking back into their short-term histories.
5. If the two roads are of significantly different nature, the expected number of vehicles and average speed on each road is different. In this case, examining the histogram of speeds of a sample of vehicles traversing the two roads may indicate how the vehicles should be allocated. For example, if the two roads within a single cell are a highway and a small, slow road, and if the vehicles known to be travelling within the cell can be partitioned into a large subset of vehicles all travelling quickly and a small subset of vehicles all travelling much more slowly then the two subsets of vehicles obviously correspond to the highway and slow road respectively.

If the current travel time/speed along both roads is similar, then there may be no reason to allocate the road of each vehicle, and one travel speed/time value may be assigned to both roads.

Preferably, each mobile communication device is able to determine whether or not it is located within a vehicle. For example, if the mobile communication device is located within the vehicle's charger, it regards itself as being located within a vehicle and preferably includes this information in its outgoing messages.

Though the system may receive indistinguishable location readings of vehicles which construct the "real" traffic together with readings of other users (pedestrians, emergency vehicles etc.) the system may differentiate between them using one or more of the following methods:

a. Noticing irregular speeds: If a small proportion of vehicles drive extremely fast/slow compared to most of the others, it may regarded as an interference and discarded.

b. A specific user may be known (either by historical observation or by its own declaration) to be irrelevant.

c. If a specific area is known to have a high density of interferences, e.g. due to a large assembly or gathering, the system may choose to find its candidates elsewhere. Information regarding expected assemblies can be provided by observation or by a third party.

d. If in the near future/past the user is spotted in an area which is not natural for a road vehicle to be in (far from a road, along a train track), it probably is not a conventional road-travelling vehicle.

Apart from the information from mobile communication device users, typically comprising cellular device users, the traffic data extractor typically uses historical data from data-base 535 and/or traffic management input data as described in detail above. Historical data pertains mainly to past, not current information regarding a particular location, a particular mobile user, a particular event, or a particular period e.g. 8 o'clock in the morning, 9 o'clock on Thanksgiving morning, weekend as opposed to weekday, winter as opposed to summer, rush-hours, etc. This data may include information such as the speed (or travel time) distribution of vehicles along a given road segment along time. Traffic management data refers to information arriving from traffic lights or other elements serving or observing the population of mobile users and may also include information about road construction.

The data extracted by the traffic data extractor 150 from the input thereto typically comprises at least one of the following parameters, and preferably some or all of these:

a. The estimated travel time along a given route or from a particular location such as a current location to another location such as a user-selected destination.

b. The estimated average speed of traffic at a given location.

c. The estimated average density of traffic at a given location.

d. The estimated average flow past a given point defined along a given road.

It is appreciated that the system may learn about the location of each mobile communication device from any suitable source, such as but not limited to one, some or all of the following sources:

a. Central CDR (voice or data transmission) database—A mobile communication device's location is often recorded at the beginning and end of voice calls conducted to or from that device (CDR—call data record). This information is typically stored by the central CDR database of the cellular operator effecting the calls which database may be accessed by the system of the present invention.

A mobile communication device's location is similarly recorded in the course of transmitting and/or receiving data messages, including but not limited to short data messages transmitted or received in the course of using an SMS (short message service). This information is also typically stored by the CDR database of the cellular operator effecting the calls which database may be accessed by the system of the present invention.

b. Base station—A mobile communication device's location may pass through individual base stations of the cellular operator and it may be possible to collect this information from individual base stations, typically on-the-fly. This information may include information regarding periodic beacon transmissions sent out by the device to the network.

c. Location server—It may be possible to query a location server as to the location of a particular mobile communication device.

d. Mobile devices—Certain handset applications may provide location information. For example, an STK (SIM-tool kit) application may be triggered by a location criteria-based trigger and may, responsively send out information which includes location data. Alternatively, the application may send out location data in response to an SMS message or otherwise formatted data transmission sent to it, e.g. by the system of the present invention and/or in response to a cell broadcast transmission, e.g. from the system of the present invention. The application may send out location data in any suitable format such as but not limited to SMS format.

e. Cellular switch—A mobile communication device's location information may pass through individual switches of the cellular operator and it may be possible to collect this information from individual cellular switches, typically on-the-fly. This information may include information regarding periodic beacon transmissions sent out by the device to the network.

It is appreciated that the location information regarding a mobile user typically comprises cellular information e.g. the ID of the communication cell serving the mobile user. However, alternatively or in addition, the location information may be non-cellular. For example, an external localization source such as a GPS (global positioning system) may convey non-cellular self-location information, such as GPS information, to an individual mobile communication device.

An item of cellular or non-cellular location information received by the system of the present invention from any source, responsive to a system query to that source, is termed herein a "reply". The sources which are queried and which provide the reply may be, but are not limited to, location servers, the mobile communication devices themselves and the CDR database which may also respond to queries by generating records, apart from records which it may provide to the system on a routine basis.

Location information available to the system typically comprises not only replies to queries but also location information accumulated routinely, without recourse to queries, e.g. voice and data CDR records, a window of which is preferably routinely sent to the CDR window and reply database 555 of FIG. 10. This window is stored, in the illustrated embodiment, in the table of FIG. 11C which is part of the CDR window and reply database 555.

The following typical location combinations may be used by the system:

Initial and follow-up detection of the users in the CDRs (whether call, data or SMS).

Initial detection of the users in the CDRs (whether call, data or SMS) and follow-up by a location server.

Initial detection of the users in the CDRs (whether call, data or SMS) and a follow-up using a further triggering of such application by a cell-broadcast or SMS transmission.

Initial location by triggering a handset application by a Cell-broadcast transmission, and a follow-up using a location server.

Initial location by triggering a handset application by a Cell-broadcast transmission, and a follow-up using a further triggering of such application by a cell-broadcast or SMS transmission.

Location information may include some or all of the following types of information for the initial location, and subsequent locations, of an identified mobile communication device:

a. ID of the cell/s which is presently serving the mobile communication device, or which just finished serving the device. Typically although not always, this cell is the cell within which the mobile communication device resides.

This may or may not be accompanied by information regarding the location of the mobile communication device within its current cell e.g. cell sector or distance from Base station.

It is appreciated that mobile communication devices are sometimes served by a "distant cell", i.e. a cell other than the cell in which they are actually located. This may cause the system to erroneously think that a particular device is located within a cell other than the cell in which it is in fact located. To overcome this type of error, particularly in situations or applications in which this type of error is significant, one, some or all of the following solutions may be employed:

i. Often, the distant cell only serves the user for a very short time. Furthermore, service by a distant cell is unlikely to occur when the communication load in a certain geographical area is low, and is generally only likely to occur in a geographical area in which the communication load is high. Therefore, identification of misleading "distant cell" IDs communicated by mobile users can be effected by repeating queries to mobile users more than once. Typically, queries are repeated to most mobile users only once, and are repeated more than once only to mobile users which are suspected of being served by distant cells, typically users which are located in geographical areas which are deemed to have a high communication load.

Geographical areas may be deemed to have a high communication load on the basis of analysis of system data, typically the data stored in the table of FIG. 11C and/or on the basis of data provided by an external source, typically cellular operators. The data may be provided or generated in real time or alternatively, the data may be analyzed during set-up in order to identify fixed time periods at which certain geographical areas suffer from high communication load. Typically, within these areas and only within these areas, queries would be repeated more than once.

ii. Alternatively or in addition, a higher sampling density may be employed when handling geographical areas which are known to suffer from high communication load. For example, the method of FIG. 13 comprises a loop which operates continuously, for each road segment, until the road segment's need for update has been reduced to below a system minimum, where the need for update is, inter alia, a function of the "importance" of the road segment. In this embodiment, a higher sampling density may be achieved by assigning an importance value to each road segment at least partly on the basis of the road segment's tendency to suffer from high communication load.

iii. Alternatively or in addition, the system may obtain, typically directly from the network, the distance between the mobile communication device user and the base station serving it and ascertaining that that distance is no greater than the radius of the cell in which the mobile communication device is believed to be located, typically from the network, possibly using the time advance value characterizing the mobile device's communication with the base station. If the distance is greater than a suitably defined radius of the cell in which the user is believed to be located, this indicates that the user is probably not actually resident within the cell in question.

b. The identities of 2 adjacent cells between which a mobile communications device has just traversed.

c. Other indications of location, which may or may not be external, e.g. GPS or accurate location server.

The flow of information from mobile communication devices to the system may be determined by any suitable scheme including the following schemes:

a. Each mobile communication device provides an ongoing report, typically a periodical report, of its current location.

b. Reports are only provided by mobile communication devices responsive to queries from the system. The queries may be general requests to update re current location or may be requests for specific information that only some mobile communication devices are in a position to provide. For example, a first query may pertain to the travel time between two specific locations and only devices travelling from one to the other are capable of responding to this query. Another, second type of query may state the expected reply to the query or more typically the expected range of replies. In this case, the mobile communication devices may be operative to respond only if their reply deviates from the expected reply or expected range of replies, i.e. only a subset of those capable of responding to the first query are eligible to, or operative to, respond to the second query. For example, the devices would report if the travel time from Tel-Aviv to Jerusalem varies from the range of 47 min–52 min.

Typically, the second type of query is presented to a larger proportion of the population of mobile communication device users than is the first type of query. However, in the second option the proportion of responders may be expected to be smaller.

Typically, in order to ensure privacy of the bearers of the mobile communication devices, each such bearer is identified not by his or her network user ID in the clear, but rather by the encrypted ID. The encryption scheme for encrypting the IDs may or may not change over time.

It is appreciated that the route selected for an individual user, e.g. in step 300 of FIG. 5, is preferably the optimal route for that user, typically the route which requires least time, given traffic conditions. However, particularly if more than one route gives equally satisfactory results or passes a minimum satisfaction threshold, then the route selected for that individual user may be selected also in accordance with additional criteria, other than immediate optimization for the user in question. The additional criteria may, for example, include the desire of the system to obtain information regarding every piece of road in its area of coverage. Therefore, if no information arrives, or the information that arrives is inaccurate, pertaining to a particular route segment, whose quality (in terms of estimated travel time) is similar to another route segment, then the system may direct the next user/driver to follow mobile communication device to follow that route segment.

If a user requests information, such as travel time information or route guidance, regarding an area about which there is no current information, then one of the following solutions, or a combination thereof, may be employed:

a. Historical information regarding that area may be employed.

b. The system may assume that the area in question is substantially empty of traffic and compute travel time and preferred routes accordingly.

It is appreciated that the system of the present invention may derive velocity information only by derivation from its knowledge regarding the sequence of locations of individual vehicles over time. However, additionally or alternatively, velocity information may be derived directly from velocity-affected characteristics of the communication which is reaching the system. For example, the data communication rate of a communication arriving from or to a mobile communication device typically varies with velocity, in known ways. Similarly, the communication frequency may vary due to the motion of the mobile communication device.

When it is desired to increase the area of coverage of a system constructed and operative in accordance with a preferred embodiment of the present invention, (e.g. when setting up a new service site perhaps in a new city/country or when increasing the coverage of an existing site) then preferably, information is collected and stored pertaining to the new area of coverage, or site, including the relative locations of the mobile communication cells and the roads, within the new area of coverage. This information is termed herein the "site map". The site map may, for example, be generated by combining a road map of the site with a cell mapping of the site which is typically available from the operator of the cellular network. If more than one cellular networks are operative within the same site, the road map is combined with the cell mappings of each of the networks.

Alternatively, instead of obtaining the cell mapping from the operator of the network, the cell mapping may be simply generated by travelling throughout the site (geographical area covered by the system) with an accurate navigation source (e.g. GPS) as a reference and a mobile communication device communicating via the network in question and recording, e.g. in the table of FIG. 11A, the identities of the various cells and/or cell sectors that serve the device as it wanders and possibly also the current distance, based on the communication's time advance value, of the device from its base station. This alternative is advantageous because it typically does not require the system to gain access to any confidential or proprietary information.

ROUTE GUIDANCE

Reference is now made to FIGS. 18A–18C, which, taken together, form a preferred data structure for the roadmap data-base 610 of FIG. 10. In the illustrated embodiment, the roadmap is represented in the form of a directed graph in which each edge typically represents a one-way road segment (i.e. a two-way road segment is represented as two edges) and vertices represent intersections between road segments. However, it is appreciated that alternatively, any other suitable data representation may be employed.

FIG. 18A is a simplified illustration of a traffic map vertices table in which coordinates of each vertex, in accordance with a predetermined coordinate system such as UTM, are stored.

FIG. 18B is a simplified illustration of a traffic map edges table in which the origin and destination vertices of each one-way road segment (edge) are stored.

FIG. 18C is a simplified illustration of an optional table storing predefined routes. Each route typically comprises a sequence of one or more road segments which are linked in the sense that the destination vertex of each n'th road segment in any route is the origin vertex of the (n+l)th road segment in the same route. The Table of FIG. 18C stores the road segments included in each route, including indices indicating the order in which the road segments are arranged along the route. In the illustrated example, three routes are stored in the table of FIG. 18C of which the first and second include only one road segment each and the third includes two road segments: road segments 1 and 2.

Figure 19:
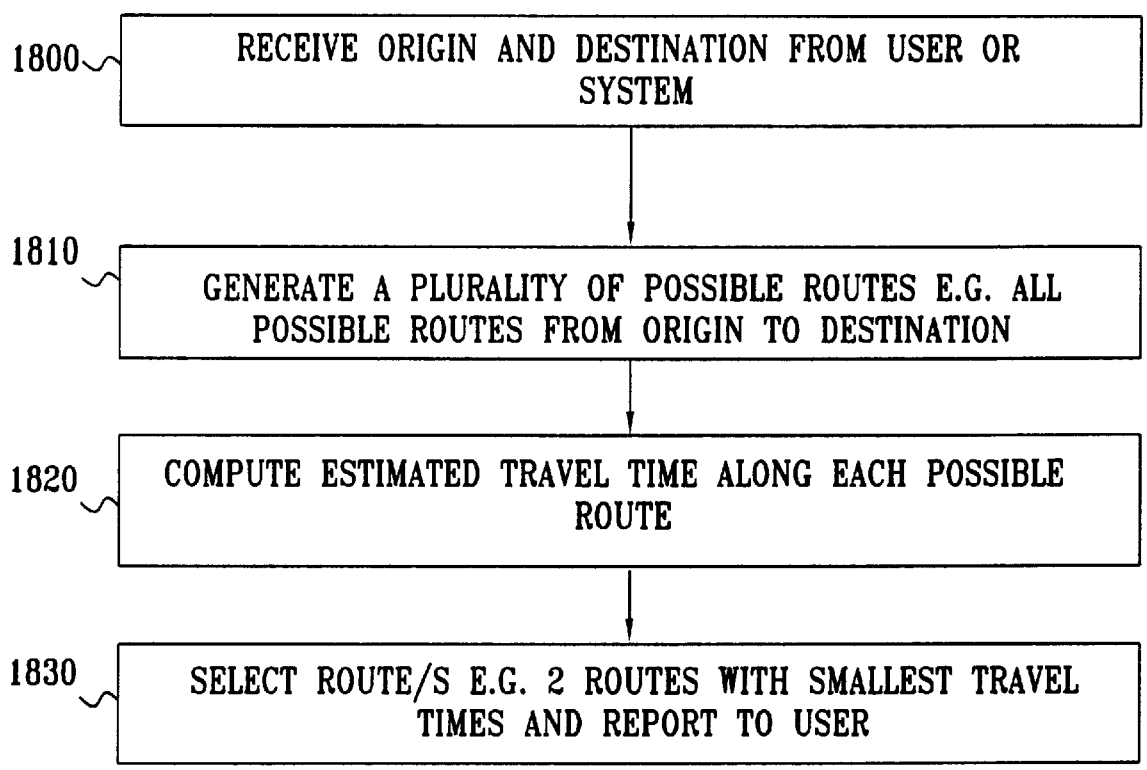
FIG. 19 is a simplified flowchart illustration of a preferred method of operation for the route guidance unit of FIG. 10.

Reference is now made to FIG. 19 which is a simplified flowchart illustration of a preferred method of operation for the route guidance unit of FIG. 10.

In step 1800, the route guidance unit receives an origin and a destination from a user or from the system and associates each with one of the vertices of the traffic map vertices table of FIG. 18A. According to one embodiment, the user inputs a street address at least for his destination, using any suitable mode of input as described in detail herein. The street address is translated into the coordinate system used to characterize the vertices e.g. the UTM coordinate system. The street address is then typically associated with the vertex in the table of FIG. 18A which is closest to that street address.

According to another embodiment of the present invention, the user inputs a current position or an indication of a past position in order to characterize his desired origin or destination. Here too, the location stipulated by the user is translated into the coordinate system used by the table of FIG. 18A and the closest vertex is identified. The current position may for example be supplied by the cellular network based on positioning the mobile device riding with the user.

In step 1810, the route guidance unit generates a plurality of possible routes e.g. all possible routes from origin to destination. According to one preferred embodiment of the present invention, the set of possible routes comprises all routes in the table of FIG. 18C for which the origin vertex of the first segment is the desired route origin and the destination vertex of the last segment is the desired route destination.

In step 1820, the route guidance unit computes the estimated travel time along each possible route by adding the travel times for each road segment along that route as computed by the traffic data extractor 550 of FIG. 10.

In step 1830, the route guidance unit selects route/s e.g. 2 routes with smallest travel times and reports the selected routes to the user. Any suitable output mode and format may be employed to supply this information to the user as described in detail herein.

Alternatively or in addition, steps 1810, 1820 and 1830 are replaced by a process which finds the n shortest paths from the origin vertex to the destination vertex, where n is a system- or user-defined parameter. The weights on the edges which determine the length of each path (route) through the traffic map typically comprise the travel time along each edge. Conventional methods may be used for shortest path finding such as that those described at the following web-site: http://www.cc.gatech.edu/aimosaic/students/Psych-students/Shika-no/ Projects/AlgoNet/spa/code.html, and in the following reference: Hiller, F. S., & Lieberman G. J., *Introduction to Operations Research*, ISBN 0-07-909758-8, Section 10.3.

One method for solving the shortest path problem is Dijkstra's Algorithm. The shortest path algorithm is given a weighted graph or digraph G=(V,E,W) and two specified vertices v and w. The algorithm finds a shortest path from v to w. The distance from a vertex v to a vertex w (denoted $d(v,w)$) is the weight of a shortest path from v to w. The algorithm finds shortest paths from v to the other vertices in order of increasing distance from v. The algorithm stops when it reaches w.

The algorithm starts at one vertex (v) and "branches out" by selecting certain edges that lead to new vertices. The algorithm is typically "greedy" in that it always chooses an edge to a vertex that appears to be closest.

Pseudocode for Dijkstra's Algorithm is as follows:

```
// Let v1 be the origin vertex,
// and initialize W and ShortDist[u] as
    W := {V1}
    ShortDist[v1]:=0
    FOR each u in V-{v1}
        ShortDist[u]:=T[v1,u]
// Now repeatedly enlarge W
// until W includes all vertices in V
    WHILE W< >V
        // Find the vertex w in V-W at the minimum distance
        // from v1
        MinDist :=INFINITE
        FOR each v in V-W
            IF ShortDist[v]<MinDist
                MinDist =ShortDist[v]
                w:=v
            END {if}
        END {for}
        // Add w to W
        W :=W U {w}
        // Update the shortest distance to vertices in V-W
        FOR each u in V-W
            ShortDist[u]:=Min(ShorDist[u], ShortDist[w]+T
                [w,u])
    END {while}
```

Referring again to step 1800 of FIG. 19, any suitable method may be used to receive input from a user defining first and second locations between which he desires to travel or is currently travelling. The user may define the first and second locations orally, in which case the oral request may be heard by a human operator or by suitable speech recognition apparatus. Alternatively, the locations may be defined by keying in, e.g. by keying in the name of a city or the name of a street, with or without a street address, or the name of a neighborhood or area or zip code.

The system may allow a user to define and store a set of locations and, for each location, a title with which the user will identify that location. For example, the user may define that "work" or "1" means 114 Park Avenue, New York, whereas "Mom's House" or "2" refers to 116 Waverly Drive in Bayonne, N.J. Subsequently, the user can refer to the above two locations as "work" and "Mom's house" respectively, or as "1" and "2" respectively.

When a user defines a request such as a route guidance request or a travel time estimation request, s/he may define his origin and destination or s/he may indicate that the origin, or the destination, comprise his or her current location which is known to the system. Unless the user otherwise indicates, the system typically assumes that the request pertains to a trip commencing immediately. However, alternatively, the user may stipulate that the trip is to be taken at a specific future time, in which case the system typically utilizes historical data characterizing that time or any other prediction method.

Route guidance information is typically provided to users responsive to their request, a request typically comprising some type of indication of origin and destination as described in detail above. Based on the knowledge of the user's current location and trajectory, the system may initiate route guidance reports prior to the user's arrival to a decision point. However, alternatively or in addition, provision of route guidance information may be system-initiated. System- or user-initiation of the route guidance provision process may initiate provision of guidance pertaining one route or alternatively, the system or user may initiate periodic provision of route guidance or provision of route guidance in accordance with a particular schedule or responsive to user- or system-defined cues. For example, a user who leaves his home for work at a regular time may program the system to provide route guidance at a particular time each morning.

According to a preferred embodiment of the present invention, the route guidance information provided to a user comprises ETA (estimated time of arrival) or travel time information. This type of information may be provided as a simple indication or may be provided only if the ETA or travel time deviate from a norm, or only if the predicated ETA or travel time suddenly change, relative to the system's predictions thereof a short time before, due to a sudden or gradually accumulating but substantial change in conditions. Alternatively, this information may be presented to the user only in circumstances where the change in travel time affects the relative attractiveness of a plurality of possible routes. Any suitable combination of the above information presentation conditions may also be employed.

Optionally, the route guidance information may also include reports of unusual events, such as accidents or traffic jams, typically events which are affecting or can be expected to affect traffic flow.

Optionally, route guidance information and particularly ETA information is improved by gradually collecting information about the implications of various types of events. Typically, the system of the present invention utilizes a suitable mathematical model of at least one event such as a traffic accident in order to predict traffic effects. For example, a suitable mathematical model for a sudden change in traffic conditions is described in "Calculation of Traffic Flow at a Bottleneck", Section 5.2.8 of Transportation Research Broad's (TRB) Revised Special Report, "Traffic Flow Theory".

Route guidance information may be provided to the user by any suitable medium and in any suitable format such as but not limited to SMS (short message service), IVR (interactive voice response), Cell broadcast, WAP (wireless application protocol) based applications, or via PDA (personal digital assistant). Route guidance information may be provided via a call center manned by human operators.

Optionally, route guidance information and particularly ETA information is improved by gradually collecting personal habit information about each individual user and adjusting general route guidance and ETA computations to take into account a user's personal habits. For example, a user's habitual speed when driving on an open road, e.g. the degree to which the user habitually approaches the actual speed limit, may affect the optimal route recommendation and the ETA. Another example, for a user who habitually travels over a certain route, only some of which is included in the geographical knowledge base of a particular route guidance system, is the amount of time that user requires to cover that portion of his journey which is not included in the geographical knowledge base.

Personal habit information may be gathered directly e.g. by prompting a user, upon registration, to respond to questions such as "How fast would you normally drive on an open road for which the speed limit is 65 mph" Alternatively or in addition, personal habit information may be deduced by comparing a user's actual progress along a route to the system's prediction of that progress.

Optionally, the system is operative to determine, when possible, the actual road which the user is driving upon. This determination may be an absolute and definite determination or may be a probabilistic determination e.g. a determination that there is a high probability, rather than a certainty, that a particular user is on a particular street.

The system may collect this information regarding the actual road a user is driving on by presenting a direct question to the user and using conventional speech recognition or wordspotting techniques to recognize the name of the road uttered by the user or to pick out the name of the road from among only a few candidate roads which are feasible judging from the system's geographical knowledge base in combination with knowledge regarding the user's previous location and/or direction of travel.

For example, if the system knows that a user is in a particular cell, which may be only a few hundred meters in diameter, then there are only a limited number of roads on which the user may be travelling and therefore, the speech recognition task involved in deciphering the user's response to the question "What road are you on" is limited to identifying a match between the user's utterance and a relatively small number of possible interpretations of that utterance.

Knowledge of the identity of the street on which the user is travelling allows street-specific information to be used by the system, e.g. a police report that a particular street is closed, or under construction, or that a traffic accident or traffic jam has occurred on a particular street.

According to a preferred embodiment of the present invention, information regarding the current location of a user's vehicle is at least sometimes sharpened or "pinpointed" e.g. by combining cellular information and street information. For example, if a user is known to be within a particular cell, and is known to be on a particular street, then his location can be pinpointed to the intersection between that cell and that street. Alternatively or in addition, each mobile user's location may be defined in terms of a trajectory or sequence of more than one cell through which the user has passed, as described in detail herein. This information also allows cell-ID level information to be sharpened or pinpointed to a level in excess of the original cell-ID level.

Preferably, the system of the present invention includes a billing subsystem. Billing may be on a monthly basis, with unlimited or limited query privileges for each user. Alternatively, billing may be per-query.

Alternatively, users may not be billed for the service in which case users only pay for air-time expended in cellular communication with the system of the present invention. In this case, the cellular communication provider shares part of his revenues with the operator of the system of the present invention for increased air-time, typically based on records kept by the system of the present invention, on each query addressed to the system.

A particular advantage of a preferred embodiment of the present invention is that location-specific advertisement may be provided to individual users depending on their anticipated locations, rather than their present locations. The system can estimate anticipated locations based on a user's current location, destination and, preferably, information regarding traffic and other conditions in the portion of the user's route separating his current location from his destination. The system's knowledge of the user's anticipated location, rather than current location, allows the system ample time to present the advertisement to the user and allows the user time to decide to utilize the advertisement information and to effect that decision.

In accordance with a further embodiment of the present invention, the location-specific advertisement is progressively altered as the proceeds along the driver's route based on the knowledge of the driver's chosen route and the driver's current location. The change in the advertisement is performed in real time along the driver's route, by altering or "flipping" the advertisements from time to time as the driver approaches a particular advertisement.

Information regarding anticipated locations may also be provided to cellular communication operators, particularly information suggesting a future congestion situation in which many cellular communication device users are about to congregate within a small area. Information provided by the system of the present invention allows the cellular communication operator time to gear up to the anticipated congestion by assigning additional resources to the area in which congestion is due to occur. Similarly, information suggesting that a current congestion situation is about to dissipate allows the cellular communication operator time to relocate expensive special resources which may have been temporarily assigned to the congested area.

Optionally, the system is operative to provide information to non-subscribed drivers so as to provide an incentive to these users to subscribe to the route guidance service provided by the system of the present invention. The information provided to non-subscribed users may, for example, comprise warnings of traffic jams and other events.

Another application of the present invention pertains to tollway systems. Based on the locations of all vehicles for which localization is possible (e.g. digital cellular operator's users, vehicles equipped with GPS (global positioning system) etc.) a tollway system may be provided with all necessary information regarding the tollway segments travelled by each car. Therefore all existing toll debit means (e.g. toll gates, tollcards, electronic toll wallet etc.) may be replaced by a system that periodically, e.g. monthly, computes an exact total debit for each vehicle, based upon information listing all toll way segments that the vehicle has passed during the time period in question.

Still another application of the present invention pertains to fleet management systems. Based on the location, provided by any suitable vehicle location source, of all vehicles belonging to a fleet, a fleet management system is able to compute the individual average velocity of any car that belongs to the fleet during any time period. Also, the system of the present invention is capable of providing traffic information which would allow a fleet manager to select a vehicle, from among several vacant vehicles in the fleet, which can most quickly arrive at a particular destination, such as the current location of a passenger who has ordered a taxi. Typically, the vacant vehicle to send to a particular destination is selected by selecting, from among the vacant vehicles in the fleet, the one having the shortest estimated arrival time to the destination in question.

A particular feature of a preferred embodiment of the present invention is that the current location of a mobile user, needs to be known only at communication cell ID accuracy. In other words, it is not necessary to position the mobile user at sub-cell accuracy by determining the user's position within the cell. Instead, it is possible to provide at least some traffic characterizing information using location information which is at communication cell ID accuracy and not at sub-cell accuracy.

It is appreciated that the software components of the present invention may, if desired, be implemented in ROM (read only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A traffic monitoring system comprising:
    traffic data collection apparatus operative to collect location data from a plurality of users of mobile communication devices; and
    a traffic data filter operative to analyze said location data arriving from the plurality of users and to reject location data which is not traffic data.

2. A system according to claim 1 wherein said traffic data filter comprises a traffic element identifier operative to identify traffic elements within the plurality of users by analyzing the location data arriving from the plurality of users.

3. A system according to claim 1 wherein said location data comprises a sequence of at least one time-stamped locations.

4. A system according to claim 1 and wherein the traffic data filter is operative to accept, as traffic data, the location data arriving from users who have identified themselves as traffic elements.

5. A system according to claim 1 and also comprising a user location database storing, for each mobile communication device from which readings have been received, the ID of that device and each of the readings received, each with its own timestamp.

6. A system according to claim 1 and also comprising a road traffic database storing, for at least one road, velocity profiles computed for that road, each profile being stored with its own time-stamp.

7. A traffic monitoring system comprising:
    location collection apparatus operative to collect location data from at least a traffic population including a multiplicity of traffic elements, the multiplicity of traffic elements comprising a plurality of users of mobile communication devices;
    a location data analyzer operative to analyze said location data and to derive traffic information therefrom; and
    a traffic information disseminator operative to provide at least some of the traffic population with said traffic information.

8. A system according to claim 7 wherein said location data analyzer is operative to derive, for at least one traffic element, at least a portion of a road route followed by the traffic element.

9. A system according to claim 7 wherein the location data defining the location of a mobile communication device at time t is based only on an identification of a mobile communication cell serving the mobile communication device at time t.

10. A system according to claim 7 wherein the location data defining the location of a mobile communication device at time t is based on an identification of a mobile communication cell serving the mobile communication device at time t.

11. A system according to claim 10 wherein said identification of a mobile communication cell comprises at least one of the following identification information elements:
    an ID of the cell;
    a cell sector; and
    a time advance parameter characterizing communication between the mobile communication device and the cell's base station.

12. A traffic monitoring method comprising:
    collecting location data from a plurality of users of mobile communication devices; and
    analyzing said location data arriving from the plurality of users and rejecting location data which is not traffic data.

13. A method according to claim 12, and also comprising rejecting location data indicating a too-large discrepancy between a current location of a vehicle and its stored previous locations.

14. A traffic monitoring system for monitoring traffic comprising a population of users bearing a multiplicity of mobile communication devices, the system comprising:
    a mobile communication network interface receiving, from at least one communication network serving the multiplicity of mobile communication devices, and storing, location information characterizing at least some of the multiplicity of mobile communication devices; and
    a traffic monitor operative to compute at least one traffic-characterizing parameter on the basis of the location information.

15. A system according to claim 14 wherein the traffic monitor is also operative to display the at least one traffic characterizing parameter.

16. A system according to claim 14 wherein the mobile communication devices comprise cellular communication devices served by at least one cellular communication network comprising a plurality of base stations each serving a cell comprising a portion of a geographical area.

17. A system according to claim 16 wherein the mobile communication network interface receives and stores location information from cellular communication devices served by more than one cellular communication network.

18. A system according to claim 14 wherein said location information comprises indications of cells serving at least some of the multiplicity of mobile communication devices.

19. A system according to claim 18 wherein the traffic monitor is operative to identify a set of mobile communication devices suspected of be served by a cell other than the cell in which they are actually located and to verify at least some location information arriving from at least some of the mobile communication devices in said set.

20. A system according to claim 18 and also comprising a road database storing locations of roads in a geographical area,
wherein the traffic monitor is operative to deduce, based on at least one indication of a cell in which a mobile communication device is located, a road which the mobile communication device is believed to be taking.

21. A system according to claim 20 wherein the traffic monitor is operative, based on an indication that an individual mobile communication device is travelling through a cell sequence including at least one cell, to differentiate a first road portion along which the individual mobile communication device is travelling, from a second road portion falling along the same cell sequence, along which the mobile communication device is not travelling.

22. A system according to claim 21 wherein the traffic monitor is operative to differentiate the first and second road portions by estimating at least one traffic parameter for the first and second road portions which parameter has different values for the first and second road portions.

23. A system according to claim 18 wherein at least some traffic characterizing information is generated using communication cell ID-based location information which is at communication cell ID accuracy.

24. A system according to claim 23 and also comprising a mobile user pinpointing function operative to deduce, from information at communication cell ID accuracy, location information which is at an accuracy higher than communication cell ID accuracy, by combining the communication cell ID accuracy information with additional stored information.

25. A system according to claim 24 wherein said additional stored information comprises information regarding intersections between cells and roads.

26. A system according to claim 24 wherein said additional stored information comprises information regarding a sequence of cells through which a user has passed.

27. A system according to claim 26 wherein said information regarding a sequence comprises a time-stamped identification of at least one pair of adjacent cells between which the user has passed.

28. A system according to claim 14 and also comprising a road database storing locations of roads in a geographical area.

29. A system according to claim 14 wherein said at least one traffic-characterizing parameter comprises at least one of the following group of parameters:
a travel time parameter;
a traffic speed parameter;
a traffic density parameter; and
a traffic flow parameter.

30. A system according to claim 14 and also including at least one historical database storing historical location information characterizing past distributions of users over a geographical area of interest, and wherein the traffic monitor is, at least on occasion, operative to compute the at least one traffic-characterizing parameter at least partly on the basis of the historical location information.

31. A system according to claim 30 wherein said historical location information comprises historical traffic information comprising at least one traffic parameter characterizing at least one road segment for at least one point of time in the past.

32. A system according to claim 30 wherein the traffic monitor is operative to evaluate the quality of location information on the basis of which the traffic-characterizing parameter is to be computed and to employ the historical location information if said quality is found to be relatively low.

33. A system according to claim 32 wherein the quality of location information is evaluated at least partly as a function of the number of users providing current location information.

34. A system according to claim 30 and also comprising a congestion detector operative to detect at least one of generation and dissipation of mobile communication device congestion.

35. A system according to claim 34 and also comprising a congestion-anticipation based cellular network resource allocator operative to receive a congestion-indicative output from the congestion detector and to allocate resources accordingly.

36. A system according to claim 34 wherein said congestion detector employs said historical location information to anticipate future locations of mobile communication devices.

37. A system according to claim 14 wherein the mobile communication network interface receives at least some of the location information used by the traffic monitor, from a base station.

38. A system according to claim 14 wherein the mobile communication network interface receives at least some of the location information used by the traffic monitor, from a CDR database.

39. A system according to claim 14 wherein the mobile communication network interface receives at least some of the location information used by the traffic monitor, from a location server.

40. A system according to claim 14 wherein the mobile communication network interface receives at least some of the location information used by the traffic monitor, directly from at least some of the multiplicity of mobile communication devices.

41. A system according to claim 40 wherein at least some of the location information provided by the mobile communication devices is provided in SMS format.

42. A system according to claim 40 wherein at least some of the location information is provided responsive to a cell broadcast.

43. A system according to claim 40 wherein at least some of the location information is provided responsive to a data transmission directed to individual ones of the multiplicity of mobile communication devices.

44. A system according to claim 43 wherein the data transmission comprises an SMS message.

45. A system according to claim 14 wherein the mobile communication network interface also receives and stores travel time information and said traffic monitor is operative to compute at least one traffic-characterizing parameters on the basis of at least the travel time information.

46. A system according to claim 13 wherein the location information does not violate the privacy of the users of the mobile communication devices.

47. A system according to claim 14 wherein the mobile communication network interface receives at least some of the location information used by the traffic monitor, from a cellular switch.

48. A system according to claim 14 wherein said traffic monitor is also operative to receive speed data derived from a change in at least one parameter characterizing communication between at least one mobile communication device and a base station serving it and to compute at least one traffic-characterizing parameter at least partly based on said speed data.

49. A system according to claim 48 wherein said parameter comprises communication frequency.

50. A system according to claim 48 wherein said parameter comprises rate of data transfer.

* * * * *